US006940399B2

(12) United States Patent

Tominaga et al.

(10) Patent No.: US 6,940,399 B2

(45) Date of Patent: *Sep. 6, 2005

(54) TIRE AIR PRESSURE DETECTION DEVICE FOR DETECTING AIR PRESSURE BASED ON VEHICLE SPEED SIGNAL

(75) Inventors: Motonori Tominaga, Anjo (JP); Toshiharu Naito, Okazaki (JP); Takeyasu Taguchi, Nagoya (JP); Yuichi Inoue, Tajimi (JP); Masahiro Yonetani, Toyota (JP); Masaaki Tabata, Chiryu (JP); Hideki Ohashi, Chiryu (JP); Kazuhiro Kamiya, Anjo (JP); Yukio Mori, Nagoya (JP)

(73) Assignees: Nippon Soken Inc., Nishio (JP); Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 369 days.

This patent is subject to a terminal disclaimer.

(21) Appl. No.: 10/264,263

(22) Filed: Oct. 4, 2002

(65) Prior Publication Data

US 2003/0146830 A1 Aug. 7, 2003

Related U.S. Application Data

(63) Continuation of application No. PCT/JP02/00958, filed on Feb. 6, 2002.

(30) Foreign Application Priority Data

| | | |
|---|---|---|
| Feb. 8, 2001 | (JP) | 2001-032476 |
| Feb. 8, 2001 | (JP) | 2001-032479 |
| Feb. 8, 2001 | (JP) | 2001-032480 |
| Feb. 8, 2001 | (JP) | 2001-032481 |

(51) Int. Cl.[7] .................... B60C 23/00

(52) U.S. Cl. .................... 340/444; 340/442; 340/443; 340/671; 340/672; 73/146; 73/146.2

(58) Field of Search .................... 340/444, 442, 340/443, 671, 672; 73/146, 146.2; 250/203.1; 303/122.06

(56) References Cited

U.S. PATENT DOCUMENTS

| | | | |
|---|---|---|---|
| 5,564,796 A | * 10/1996 | Saito et al. | 303/112 |
| 5,670,716 A | 9/1997 | Tamasho et al. | |
| 5,939,626 A | 8/1999 | Tominaga et al. | |
| 5,982,279 A | 11/1999 | Tominaga et al. | |
| 6,566,640 B2 | * 5/2003 | Wu et al. | 250/203.1 |

FOREIGN PATENT DOCUMENTS

| | | |
|---|---|---|
| JP | A-7-40720 | 2/1995 |
| JP | A-8-216636 | 8/1996 |
| JP | A-10-100623 | 4/1998 |
| JP | A-10-100624 | 4/1998 |
| JP | A-10-129222 | 5/1998 |
| JP | A-10-157419 | 6/1998 |
| JP | A-10-175411 | 6/1998 |
| JP | A-10-193933 | 7/1998 |
| JP | A-10-239334 | 9/1998 |
| JP | A-10-258617 | 9/1998 |
| JP | A-11-5417 | 1/1999 |
| JP | A-11-180118 | 7/1999 |
| JP | A-2002-59724 | 2/2002 |

* cited by examiner

*Primary Examiner*—Davetta W. Goins

(74) *Attorney, Agent, or Firm*—Posz Law Group, PLC

(57) ABSTRACT

A tire air pressure detection device includes an ideal driving status calculating portion (3*e*) and a rotational status value compensating portion (3*f*). The ideal driving status calculating portion calculates an ideal status value (βid) corresponding to a slip value under an ideal driving status without tire slippage. The rational status value compensating portion calculates and ideal rotational status value under the ideal driving status without tire slip based on the regression line calculated by a regression line calculating portion (3*d*) and the ideal slip status value calculated by the ideal driving status calculating portion.

31 Claims, 25 Drawing Sheets

TIRE AIR PRESSURE DETECTION DEVICE FOR DETECTING AIR PRESSURE BASED ON VEHICLE SPEED SIGNAL

CROSS REFERENCE TO RELATED APPLICATION

This application is a continuation of PCT Application No. PACT/JP02/00958 filed on Feb. 6, 2002, the contents of which are incorporated herein by reference.

FIELD OF THE INVENTION

The present invention relates to a device for detecting a tire air pressure based on a vehicle speed signal.

DESCRIPTION OF THE RELATED ART

JP-A-H10-100624 discloses a conventional tire air pressure detection device. The tire air pressure device detects a decrease in tire air pressure based on wheel speed variation D and a front and rear wheel speed ratio β. The wheel speed variation D and the front and rear wheel speed ratio β are expressed as follows, where $V_{FR}$ corresponds to front right wheel speed, $V_{FL}$ corresponds front left wheel speed, $V_{RR}$ corresponds rear right wheel speed and $V_{RL}$ corresponds rear left wheel speed.

$$D = \frac{V_{FR}}{V_{FL}} - \frac{V_{RR}}{V_{RL}} \tag{1}$$

$$\beta = \frac{V_{FR} + V_{FL}}{V_{RR} + V_{RL}} \tag{2}$$

The wheel speed variation D represents a rotational status value calculated based on wheel speeds of four vehicle wheels. For example, the wheel speed variation D is a variable defined as a difference of wheel speed ratios of each pair of wheels located diagonally from each other, and increases or decreases when the tire air pressure of some of the vehicle wheels decrease. The front and rear wheel speed ratio β is a tire slip status value that denotes a degree of slip status of driven wheels caused by transmitted driving forces. For example, the smaller the front and rear wheel speed ration β is, the higher the slip of one (or both) of the driven wheels is.

The wheel speed variation D increases or decreases when the tire air pressures of some of the vehicle wheels decreases below a standard value, and it is zero when each tire air pressure of each tire equals the standard value. Therefore, the tire pressure decrease is detected based on the wheel speed variation D.

However, regarding, for example, a rear wheel drive vehicle, when the tire air pressure of the rear right wheel corresponding to one of the driven wheels decreases below the standard value, the other driven wheel tends to slip easier than the rear right wheel because a ground contact area of the rear right wheel increases and resistance force for suppressing the slip increases even if the diameter of the rear right wheel decreases due to the tire air pressure decrease. Accordingly, the wheel speed variation D varies based on the degree of slip status of the wheels.

Thus, as shown in FIG. 26, a regression line is calculated based on a relationship of the front and rear wheel speed ratio β and the wheel speed variation D using a minimum square calculation methodology. An ideal value of the wheel speed variation D is then calculated by compensating for the wheel speed variation D (or an average $D_{AVE}$). An ideal value of the wheel speed variation D is a value of the wheel speed variation D if the slip does not occur when the front and rear wheel speed ratio β is 1. Thus, the effect of the slip of the driven wheels is removed, and therefore the tire air pressure decrease can accurately be detected.

The ideal wheel speed variation value D is calculated under the condition that the front and rear wheel speed ratio β is 1. However, the front and rear wheel speed ratio β is not 1 when the tire air pressure decreases. Therefore, the above compensation is excessive. In this case, changes of the wheel speed variation D of the driven wheels and non-driven wheels due to the tire air pressure decrease are different, and a warning pressure, which is a pressure at which a driver is warned, varies.

In the tire air pressure device mentioned above, the tire air pressure decrease is detected under the assumption that the driving force of the wheels usually varies. Therefore, if a variation of the driving force of the wheels decreases when the vehicle is driven on a flat road at a constant speed, values of the front and rear wheel speed ratio β and the wheel speed variation D do not vary. Referring to FIG. 27, when the accuracy of the calculation of the regression line decreases because of, for example, a small noise caused by a slight turning of the vehicle, the compensation of the wheel speed variation D may not be executed appropriately. As a result, the accuracy of tire air pressure detection decreases.

The wheel speed variation D corresponding to the rotational status value relates to not only the front and rear wheel speed ratio β but also to non-uniform wheel rotation when the vehicle is driving (e.g., the non-uniform wheel rotation is caused by turning, driving on a bad road or shift shock of a transmission), varies based on the non-uniform wheel rotation and is non-uniform value. When the regression line is calculated based on the non-uniform value, the accuracy of the calculation of the wheel speed variation D decreases and therefore the warning pressure varies.

Furthermore, the wheel speed variation D varies based on the turn status of the vehicle as well as the slip status of the driven wheels. For example, the relationship of the front and rear wheel speed ratio β and the wheel speed variation D during turning is plotted in FIG. 28. The plotted results are non-uniform as compared with FIG. 26, which does not include data during turning. Therefore, if the regression line is calculated based on all plotted results, it is impossible to calculate an accurate regression line as shown in FIG. 29. As a result, the accuracy of the calculation of the wheel speed variation D decreases, and therefore the warning pressure varies.

SUMMARY OF THE INVENTION

It is therefore an object of the present invention to provide a tire air pressure detection device that is capable of obviating the above problems.

It is another object of the present invention to provide a tire air pressure detection device that is capable of increasing the accuracy of the rotational status value.

It is another object of the present invention to provide a tire air pressure detection device that is capable of obviating warning pressure non-uniform.

A tire air pressure detection device of the present invention includes an ideal driving status calculating portion (3*e*) and a rotational status value compensating portion (3*f*). The ideal driving status calculating portion calculates an ideal status value (βid) corresponding to a slip value under an ideal driving status without tire slip. The rotational status value compensating portion calculates an ideal rotational status value under the ideal driving status without tire slip based on a regression line calculated by a regression line calculating portion (3d) and the ideal slip status value calculated by the ideal driving status calculating portion.

According to the tire air pressure detection device of the present invention, an accurate rotational status value (D) under the ideal driving status without tire slip can be appropriately calculated without excessive compensation.

The tire air pressure detection device of the present invention includes a selecting portion. The selecting portion selects a rotational status value calculated by a rotational status value calculating portion and a slip status value calculated by a slip status value calculating portion within a predetermined available range. A regression line calculating portion calculates a regression line based on the rotational status value and the slip status value selected by the selecting portion.

According to the tire air pressure detection device of the present invention, the accuracy of the calculation of a regression line does not decrease due to non-uniform of the rotational status value, and therefore a warning pressure is uniform.

In the tire air pressure detection device of the present invention, a non-uniformity of the detecting portion (3i) detects the non-uniform of wheel driving forces. The rotational status value compensating portion compensates for the rotational value based on a present regression line calculated by the regression line calculating portion when the non-uniform detecting portion has detected the non-uniformity of the driven forces, while compensating for the rotational value based on a prior regression line calculated by the regression line calculating portion when the non-uniform detecting portion has not detected the non-uniformity of the driven forces.

According to the tire air pressure detection device of the present invention, even if the wheel driven force non-uniformity does not occur, a small noise caused by a slight vehicle turn does not diminish the accuracy of the calculation of a regression line.

In the tire air pressure detection device of the present invention, a selecting portion selects data from wheel speed data detected by a wheel speed detecting portion (2a–2d, 3a) by removing data while the vehicle is turning from the wheel speed data based on left and right non-driven wheel speeds ($V_{FL}$, $V_{FR}$). The rotational status value calculating portion calculates the rotational status value and the slip status value calculating portion calculates the slip status value based on the data selected by the selecting portion.

According to the tire air pressure detection device of the present invention, the accuracy of the regression line calculation does not decrease due to the non-uniform of the rotational status value caused by vehicle turns. A warning pressure is therefore uniform.

In the tire air pressure detection device of the present invention, a selecting portion defines an available range based on data regarding left and right non-driven wheel speeds detected by the wheel speed detecting portion, and selects data within the available range from the data regarding left and right non-driven wheel speeds. The rotational status value calculating portion calculates the rotational status value and the slip status value calculating portion calculates the slip status value based on the data selected by the selecting portion. The available range is defined initially based on the data regarding left and right non-driven wheel speeds, and is then repeatedly renewed every time the selecting portion selects data regarding left and right non-driven wheel speeds.

According to the tire air pressure detection device of the present invention, the accuracy of the regression line calculation does not decrease due to the non-uniform of the rotational status value caused by vehicle turns. A warning pressure is therefore uniform.

BRIEF DESCRIPTION OF THE DRAWINGS

Other objects, features and advantages of the present invention will be understood more fully from the following detailed description made with reference to the accompanying drawings in which.

DETAILED DESCRIPTION OF THE PREFERRED EMBODIMENT

Figure 1:
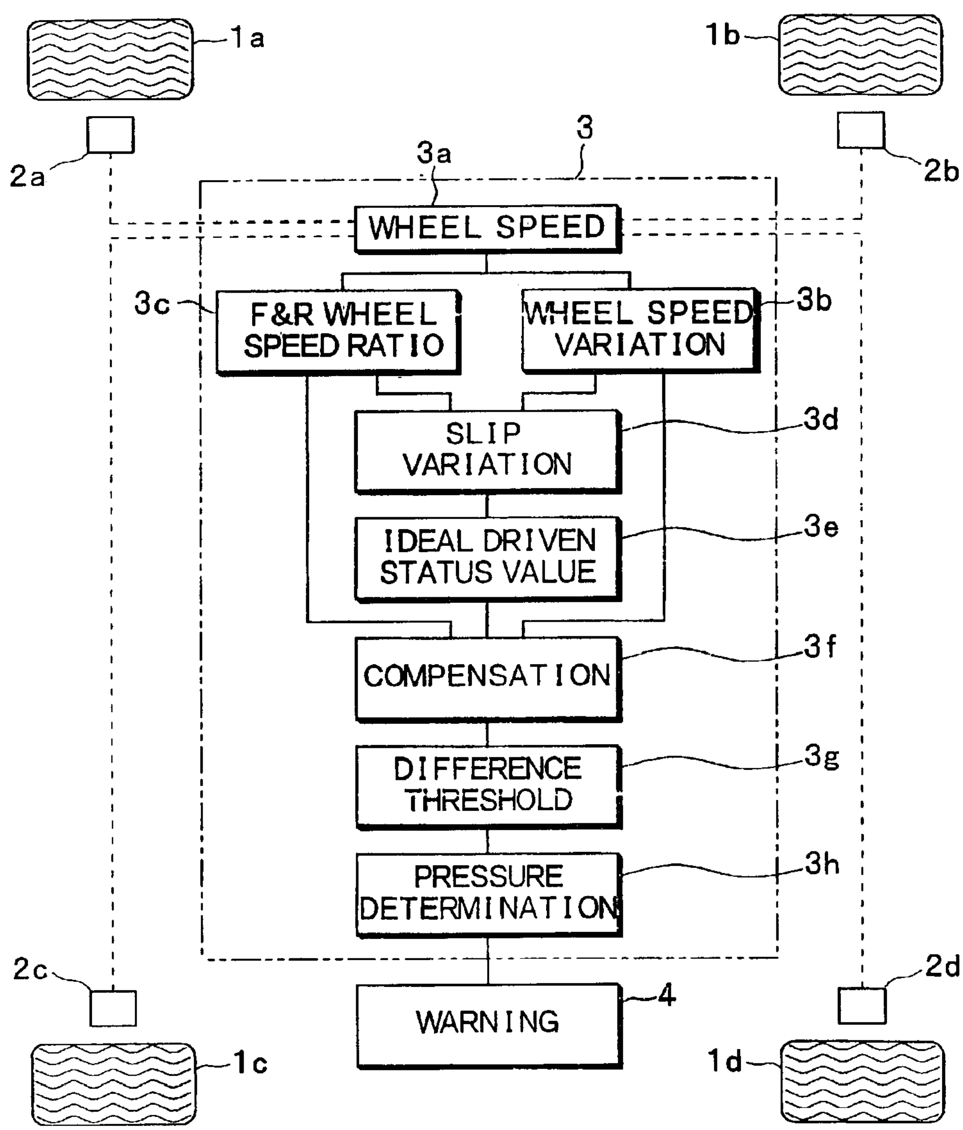
FIG. 1 is a schematic view showing a tire air pressure detection device according to a first embodiment of the present invention.

The present invention will be described further with reference to various embodiments shown in the drawings.

(First Embodiment)

Referring to FIG. 1, a tire air pressure detection device is for detecting a decrease in tire air pressure of one of the vehicle wheels and is for warning a driver. The tire air pressure detection device is applicable to both front or rear wheel drive vehicles. However, in the present embodiment, the tire air pressure detection device will be described with reference to a rear wheel drive vehicle.

The tire air pressure detection device includes vehicle wheel speed sensors 2*a*, 2*b*, 2*c* and 2*d*, which are located around respective vehicle wheels 1*a*, 1*b*, 1*c* and 1*d*, a central processing unit (CPU) 3 and a warning device 4. The CPU 3 receives input signals from the vehicle wheel speed sensors 2*a*–2*d* and determines whether tire air pressure in one or more of the vehicle wheels 1*a*–1*d* decreases to output a warning signal to the warning device 4. Incidentally, the vehicle speed sensors 2*a*–2*d* correspond vehicle speed detecting portions.

The vehicle wheel speed sensors 2*a*, 2*b* respectively detect and output wheel speed signals of respective non-driven wheels (i.e., left and right front wheels). The vehicle wheel speed sensors 2*c*, 2*d* detect and output wheel speed signals of respective driven wheels (i.e., left and right rear wheels).

The CPU 3 is a microcomputer or the like and calculates respective values based on detected signals from the vehicle wheel speed sensors 2*a*–2*d*. The CPU 3 is constructed as follows.

The CPU 3 includes a vehicle wheel speed calculation portion 3*a* and a vehicle wheel speed variation processing portion 3*b*. The vehicle wheel speed calculation portion 3*a* calculates respective vehicle wheel speeds of respective wheels 1*a*–1*d* based on detected signals (e.g., pulse signals) from the vehicle wheel speed sensors 2*a*–2*d*. The vehicle wheel speed variation processing portion 3*b* includes a vehicle speed variation calculating portion corresponding to a rotation status value calculating portion, a first vehicle speed variation memorizing portion, and a vehicle speed variation average processing portion. Results calculated by the vehicle wheel speed variation processing portion 3*b* are used for processing regarding a relative vehicle speed variation D.

The wheel speed calculating portion 3*a* calculates the respective vehicle wheel speeds of the respective wheels 1*a*–1*d* based on detected signals from the vehicle wheel speed sensors 2*a*–2*d*. For example, respective vehicle wheel speeds $V_{FL}$, $V_{FR}$, $V_{RL}$ and $V_{RR}$ are calculated based on signals from the vehicle wheel speed sensors 2*a*–2*d* inputted over several seconds. The vehicle wheel speed variation calculating portion then calculates a wheel speed variation D using the above-mentioned equation (1) based on data corresponding to calculated vehicle wheel speeds. The resultant data of the wheel speed variation D is stored in a memory included in the first wheel speed variation memorizing portion. Also, the wheel speed variation average processing portion calculates an average value $D_{AVE}$ of the wheel speed variations D based on the resultant data of the wheel speed variation D. The average value $D_{AVE}$ of the wheel speed variation D corresponds to the average of $n_0$ portions of the wheel speed variation D expressed as the following equation.

$$D_{AVE} = \frac{1}{n_0}\sum D(N) \tag{3}$$

The CPU 3 includes a front and rear wheel speed ratio processing portion 3*c*. The front and rear wheel speed ratio processing portion 3*c* includes a front and rear wheel speed ratio calculating portion corresponding to a slip status value calculating portion, a front and rear wheel speed ratio memorizing portion, and a front and rear wheel speed ratio average processing portion. In the front and rear wheel speed ratio processing portion 3*c*, the front and rear wheel speed ratio calculating portion calculates a front and rear wheel speed ration β using the above-mentioned equation (2) based on data from the wheel speed calculating portion 3*a*. The resultant data of the front and rear wheel speed ratio β is stored in a memory included in the front and rear wheel speed ratio memorizing portion. Also, the front and rear wheel speed ratio average processing portion calculates the average value $\beta_{AVE}$ of the front and rear wheel speed ratios β based on the resultant data of the front and rear wheel speed ratio β. The average value $\beta_{AVE}$ of the front and rear wheel speed ratios β corresponds to the average of $n_0$ portions of the front and rear wheel speed ratio β expressed in the following equation.

$$\beta_{AVE} = \frac{1}{n_0}\sum \beta(N) \tag{4}$$

The CPU 3 also includes a slip variation calculating portion 3*d*, an ideal driving status value calculating portion 3*e*, and a wheel speed variation compensating processing portion 3*f*.

The slip variation calculation portion 3*d* calculates slip variation A based on the wheel speed variation D calculated by the wheel speed variation calculating portion of the wheel speed variation processing portion 3*b*, and the front and rear wheel speed ratio β calculated by the front and rear wheel speed ratio calculating portion of the front and rear wheel speed ratio processing portion 3*c*. The slip variation A corresponds to the change in value (ΔD/Δβ) of the wheel speed variation D with respect to the front and rear wheel speed ratio β and is calculated by a minimum square calculation methodology using $n_0$ portions of the wheel speed variation D and the front and rear wheel speed ratio β. The slip variation calculating portion 3*d* corresponds to a regression line calculating portion.

The ideal driving status value calculating portion 3*e* calculates an ideal driving status value βid based on calculation results of the slip variation calculating portion 3*d*. The ideal driving status value βid corresponds to the front and rear wheel speed ratio β when the vehicle drives under ideal status without tire slippage, is used as a standard compensation value, and is calculated as a linear function, quadratic function or the like of the slip variation A. That is, the ideal driving status value βid is expressed by βid=F(A). For example, if the ideal driving status value βid equals a liner function of the slip variation A, it is expressed by $\beta id=1-Coef\times|A|$, where Coef is constant.

The wheel speed variation compensating processing portion 3*f* includes a wheel speed variation compensating portion and a second wheel speed variation memorizing portion. The wheel speed variation compensating portion corresponds to a rotational status value compensating portion. The wheel speed variation compensating portion calculates a post-compensation wheel speed variation $D'_{AVE}$ based on the average value $D_{AVE}$ of the wheel speed variation D for each wheel, the average value $\beta_{AVE}$ of the front and rear wheel speed ratios β, the slip variation A, and the ideal driving status value βid. The post-compensation wheel speed variation $D'_{AVE}$ corresponds to a wheel speed variation D for ideal driving status. Specifically, the post-compensation wheel speed variation $D'_{AVE}$ is calculated based on the following equation.

$$D'_{AVE}=D_{AVE}+A(\beta id-\beta_{AVE}) \quad (5)$$

The second wheel speed variation memorizing portion selects and memorizes reference value $D'_{AVE}$std based on the post-compensation wheel speed variation $D'_{AVE}$. The reference value $D'_{AVE}$std corresponds to post-compensation wheel speed variation $D'_{AVE}$ when tire air pressures of four wheels are identical to be used for a reference value in determining tire air pressure decrease. The reference value $D'_{AVE}$std is calculated based on the average value $D_{AVE}$ of the wheel speed variation D for each wheel, the average value $\beta_{AVE}$ of the front and rear wheel speed ratios β, the slip variation A, and the ideal driving status value βid calculated based on the wheel speed variation D and the front and rear wheel speed ratio β calculated immediately after the CPU 3 starts.

The CPU 3 further includes a pressure differential threshold calculating portion 3*g* and a tire air pressure decrease determination portion 3*h*. The pressure differential threshold calculating portion 3*g* calculates a pressure difference determination value $\Delta D'_{AVE}$ based on the reference value $D'_{AVE}$std memorized in the second wheel speed variation memorizing portion and the post-compensation wheel speed variation $D'_{AVE}$ calculated by the wheel speed variation compensating portion. The pressure differential determination value $\Delta D'_{AVE}$ equals a difference between the reference value $D'_{AVE}$ std and the post-compensation wheel speed variation $D'_{AVE}$($\Delta D'_{AVE}=D'_{AVE}std-D'_{AVE}$) and is used for evaluating tire air pressure decrease.

The tire air pressure decrease determination portion 3*h* compares an absolute value $|D'_{AVE}|$ of the pressure differential determination value $\Delta D'_{AVE}$ to a predetermined threshold value Dsh to determine tire air pressure decrease. Specifically, when the absolute value $|\Delta D'_{AVE}|$ is higher than the predetermined threshold value Dsh, the tire air pressure decrease determination portion 3*h* transmits a warning signal denoting tire air pressure decrease to the warning device 4. The warning device 4 warns a vehicle driver of the tire air pressure decrease by causing a warning light equipped in a vehicle passenger compartment to blink.

Figure 2:
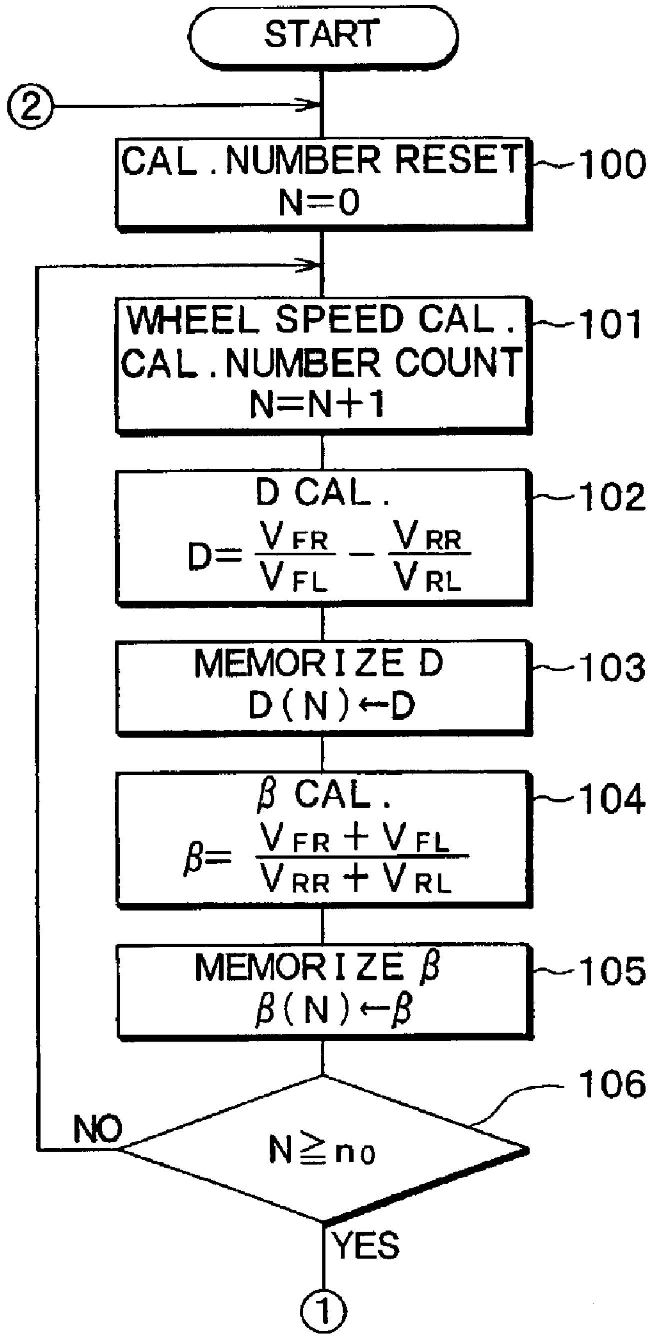
FIG. 2 is a flow diagram showing tire air pressure detection processing according to the first embodiment.
Figure 3:
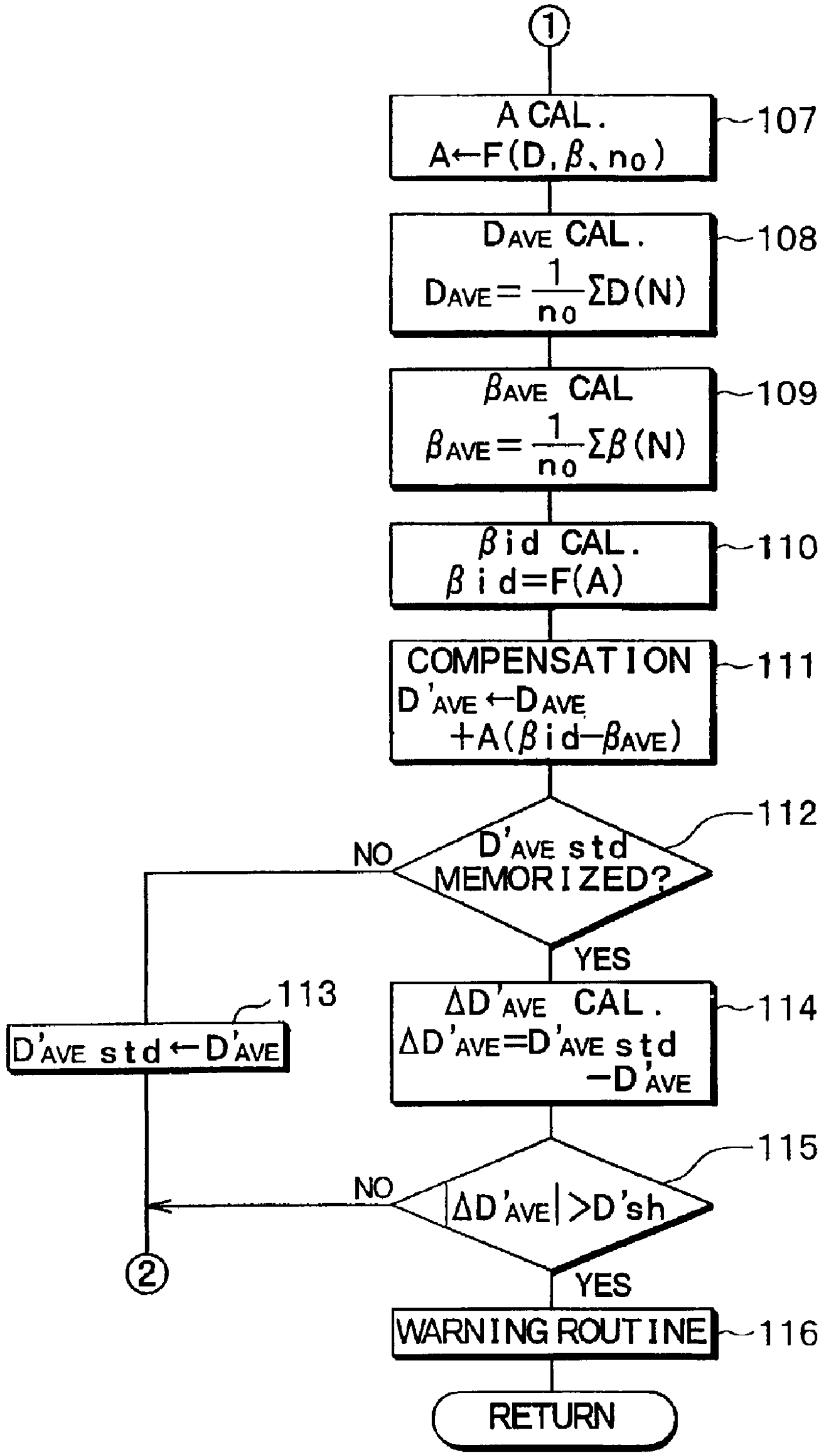
FIG. 3 is the flow diagram showing tire air pressure detection processing following FIG. 2.

Details of tire air pressure determination processing will now be described with reference to FIGS. 2 and 3.

At 100, a wheel speed calculation number N of the wheel speed is reset (N=0). At 101, as wheel speed calculating processing is performed based on the detected signals from the wheel speed sensors 2*a*–2*d*, the wheel speed calculating portion 3*a* calculates respective vehicle wheel speeds $V_{FL}$, $V_{FR}$, $V_{RL}$ and $V_{RR}$. The CPU 3 then increases the wheel speed calculation number N. The processing calculates respective wheel speed averages of each wheel few several minutes based on the wheel speed pulse generated during those few minutes.

At 102, during wheel speed variation calculating processing, the wheel speed variation calculating portion of the vehicle wheel speed processing portion 3*b* calculates the wheel speed variation D. The wheel speed variation D is calculated by substituting the respective vehicle wheel speeds $V_{FL}$, $V_{FR}$, $V_{RL}$ and $V_{RR}$ calculated at 101 into equation (1).

At 103, the first wheel speed variation memorizing portion memorizes the wheel speed variation D calculated at 102 to add memorized wheel speed variations D(N). Incidentally, D(N) corresponds to a stored arrangement of $n_0$ portions of the wheel speed variation D in a position of the memory corresponding to a number of calculations. The first wheel speed variation memorizing portion re-stores a new wheel speed variation D in the position of the memory corresponding to wheel speed calculation number N when, for example, the wheel speed calculation number N is reset at 100 after the $n_0$ portions of the wheel speed variations D are memorized.

At 104, during front and rear wheel speed ratio calculating processing, the front wheel speed ratio calculating portion of the front wheel speed ratio processing portion 3*c* calculates a front and rear wheel speed ratio β. The front and rear wheel speed ratio β is also calculated by substituting the respective vehicle wheel speeds $V_{FL}$, $V_{FR}$, $V_{RL}$ and $V_{RR}$ calculated at 101 into equation (2). At 105, the memory of the front and rear wheel speed ratio memorizing portion memorizes the front and rear wheel speed ratio β calculated at 104 to add memorized front and rear wheel speed ratios β(N). Incidentally, β(N) corresponds to an arrangement of $n_0$ memorized portions of the front and rear wheel speed ratio β stored in a position of the memory corresponding to the number of calculations. The front and rear wheel speed ratio memorizing portion re-stores a new front and rear wheel speed ratio β in the position of the memory corresponding to wheel speed calculation number N as well as the D(N) after the $n_0$ portions of the front and rear wheel speed ratios β are memorized.

At 106, the CPU 3 determines whether the wheel speed calculation number N is larger than $n_0$. The processing advances to 107 when a determination at 106 is positive because $n_0$ portions of the wheel speed variation D of each wheel and the front and rear wheel speed ratios p are memorized, and returns at 101 when the determination at 106 is negative.

At 107, during slip variation calculating processing, the slip calculating portion 3*d* calculates a slip variation A. That is, a regression line corresponding to a linear function of the wheel speed variation D and the front and rear wheel speed ratio β is calculated, and the slip variation A is calculated based on the regression line. The slip variation A expresses a dependent degree of the wheel speed variation D with respect to the front and rear wheel speed ratio β.

At 108, during wheel speed variation averaging processing, the wheel speed variation averaging portion of the wheel speed variation processing portion 3*b* calculates an average value $D_{AVE}$ of the wheel speed variation D of each wheel. The average value $D_{AVE}$ of the wheel speed variations D is calculated by substituting respective wheel speed variations D memorized at 103 into equation (3).

At 109, during front and rear wheel speed ratio averaging processing, the front and rear wheel speed ratio averaging processing portion of the front and rear wheel speed ratio processing portion 3*c* calculates an average value $\beta_{AVE}$ of the front and rear wheel speed ratios β stored in the memory. The average of the front and rear wheel speed ratios β is calculated by substituting respective front and rear wheel speed ratios β memorized at 105 into equation (4).

At 110, during ideal driving status value calculating processing, the ideal driving status value calculating portion 3*e* calculates an ideal driving status value βid. The ideal driving status value βid is calculated based on the linear function, quadratic function or the like of the slip variation A calculated at 110.

At 111, during wheel speed variation compensating processing, the wheel speed variation compensating portion of the wheel speed variation compensating processing portion 3*f* calculates a post-compensation wheel speed variation $D'_{AVE}$ by substituting the average value $D_{AVE}$, the average value $\beta_{AVE}$, the slip variation A, and the ideal driving status value βid calculated at 107–110 respectively into equation (5).

At 112, the CPU 3 determines whether the reference value $D'_{AVE}$std has already been determined. The processing determines whether the reference value $D'_{AVE}$std is stored in the memory of the second wheel speed variation memorizing portion of the wheel speed variation compensating processing portion 3*f*. If the reference value $D'_{AVE}$std is calculated at first after the CPU 3 starts, the processing advances to 113 to store the post-compensation wheel speed variation $D'_{AVE}$ calculated as a reference value $D'_{AVE}$std and then returns to 100. On the other hand, if the reference value $D'_{AVE}$std has already been stored, the processing advances to 114.

At 114, for pressure difference threshold calculating processing, the pressure difference threshold calculating portion 3*g* calculates a pressure difference determination value $\Delta D'_{AVE}$ that corresponds to a difference between the reference value $D'_{AVE}$std and the post-compensation wheel speed variation $D'_{AVE}$.

At 115, the tire air pressure decrease determination portion 3*h* determines whether an absolute value $|\Delta D'_{AVE}|$ of the pressure difference determination value $\Delta D'_{AVE}$ is larger than the predetermined threshold value Dsh. The processing advances to 116 when a determination is positive. As a result, the tire air pressure decrease determination portion 3*h* transmits a warning signal denoting tire air pressure decrease to the warning device 4. The processing return sat 100 when the determination is negative. Thus, the tire air pressure decrease of respective wheels 1*a*–1*d* can be detected.

According to the tire air pressure detection device of the present embodiment, the slip variation A is calculated based on a wheel speed variation D and a front and rear wheel speed ratio β. An ideal driving status value βid is then calculated based on the slip variation A. Also, a post-compensation wheel speed variation $D'_{AVE}$ is calculated based on an average value $D_{AVE}$ of the wheel speed variation D of each wheel, an average value $\beta_{AVE}$ of the front and rear wheel speed ratios β, the slip variation A, and the ideal driving status value βid. Those relationships are now described with reference to FIG. 4.

Figure 4:
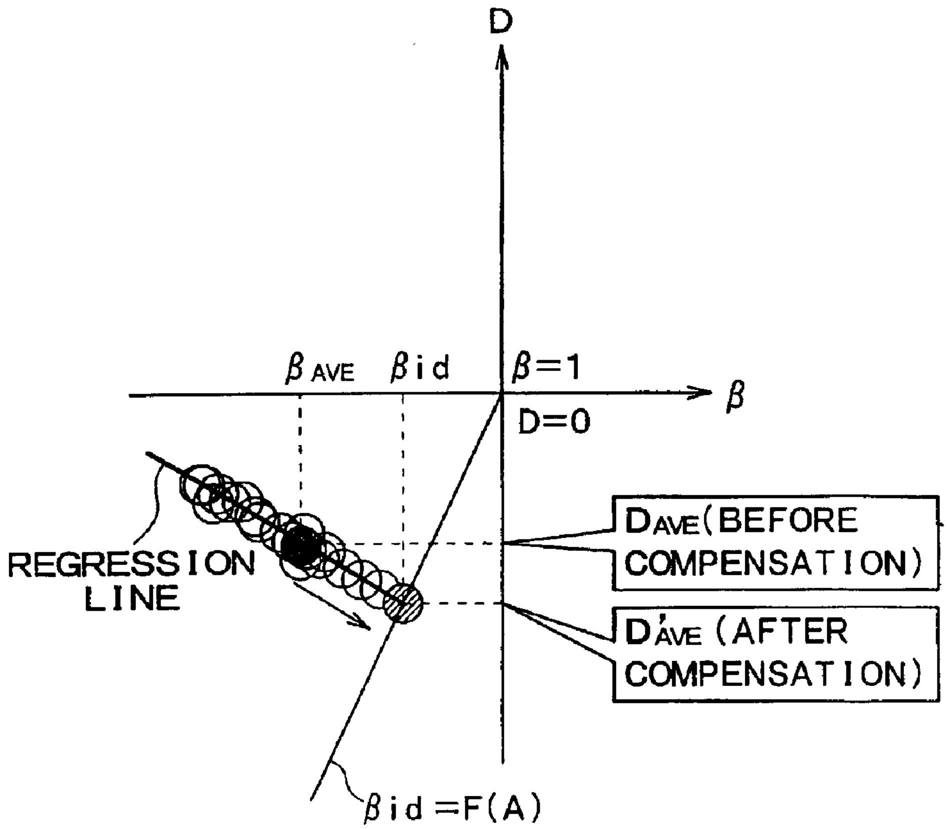
FIG. 4 is a schematic view showing a relationship between an average $D_{AVE}$ of wheel speed variation D before compensation and a wheel speed variation average after compensation (hereinafter referred to as a post-compensation wheel speed variation $D'_{AVE}$) according to the first embodiment.

FIG. 4 shows a relationship between the wheel speed variation D and the front and rear wheel speed ratio β when a tire air pressure of one of the driven wheels 1*c*, 1*d* (e.g., the left rear wheel) decreases. In FIG. 4, white circles (○) indicate n0 portions of the relationship between the wheel speed variation D and the front and rear wheel speed ratio β, and black circles (●) indicate a relationship between the average value $D_{AVE}$ of the wheel speed variations D and the average value $\beta_{AVE}$ of the front and rear wheel speed ratios β.

If the tire air pressure of the left rear wheel that is one of the driven wheels 1*c*, 1*d* decreases, the vehicle wheel speed $V_{RL}$ of the left rear wheel increases. Therefore, the front and rear wheel speed ratio β decreases below 1 according to the tire air pressure decrease. Since an ideal driving status value βid satisfies the equation of βid=F(A) when there is no tire slippage, it is therefore calculated based on the slip variation A and the equation of βid=F(A) as at 110.

Further, as shown at 107, a regression line corresponding to a linear function of $n_0$ portions of the wheel speed variation D and the front and rear wheel speed ratio β is calculated using a minimum square calculation methodology.

Accordingly, as shown at 111, upon calculating an intersection point of regression line and equation of βid=F(A), a post-compensation wheel speed variation $D'_{AVE}$, which corresponds to a wheel speed variation D under ideal driving status when a tire air pressure of at least one of the driven wheels 1*c*, 1*d* decreases, is calculated. Thus, the post-compensation wheel speed variation $D'_{AVE}$ can be appropriately calculated without excessive compensation.

Figure 5A:
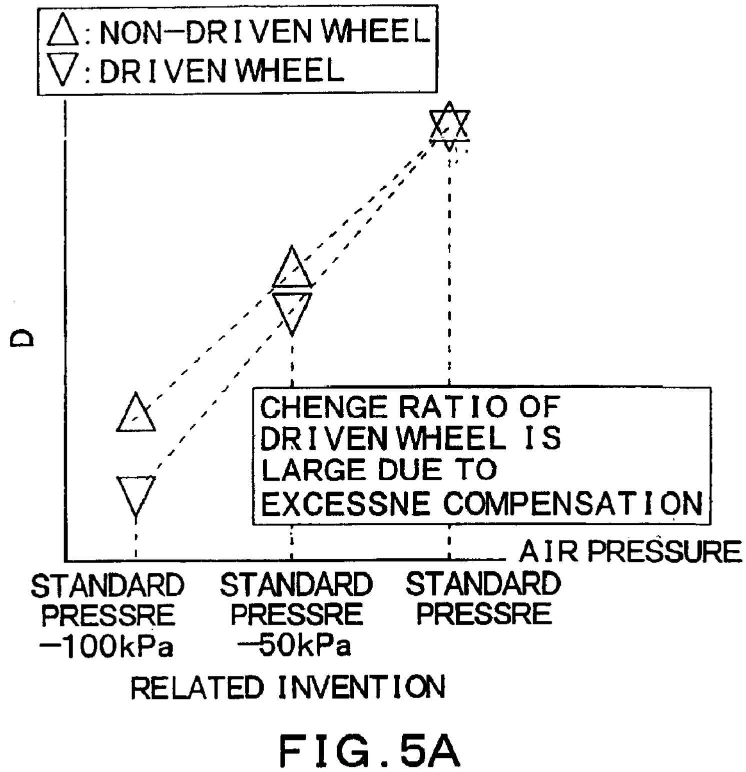
FIGS. 5A and 5B are schematic views showing change ratios of the wheel speed variation D of the tire air pressure detection device of FIG. 1 and a related art device.
Figure 5B:
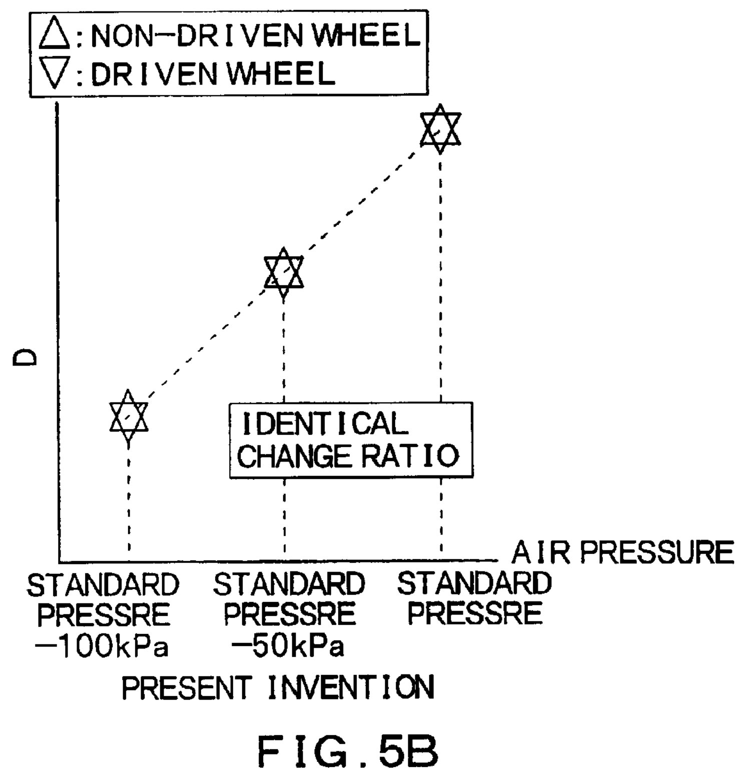

Therefore, as shown in FIG. 5A, in a tire air pressure detection device of a related art device, a post-compensation wheel speed variation change ratio when a tire air pressure of a driven wheel decreases is different from that when a tire air pressure of a non-driven wheel decreases. As a result, the post-compensation wheel speed variation when the tire air pressure of the driven wheel decreases is calculated as having a value smaller than that when the tire air pressure of the non-driven wheel decreases. To the contrary, as shown in FIG. 5B, in the tire air pressure detection device of the present embodiment, the post-compensation wheel speed variation $D'_{AVE}$ when the tire air pressure of the driven wheel decreases and that when the tire air pressure of the non-driven wheel decreases are identical. Therefore, regardless of which wheels decrease in pressure, a warning pressure remains uniform.

(Second Embodiment)

Figure 6:
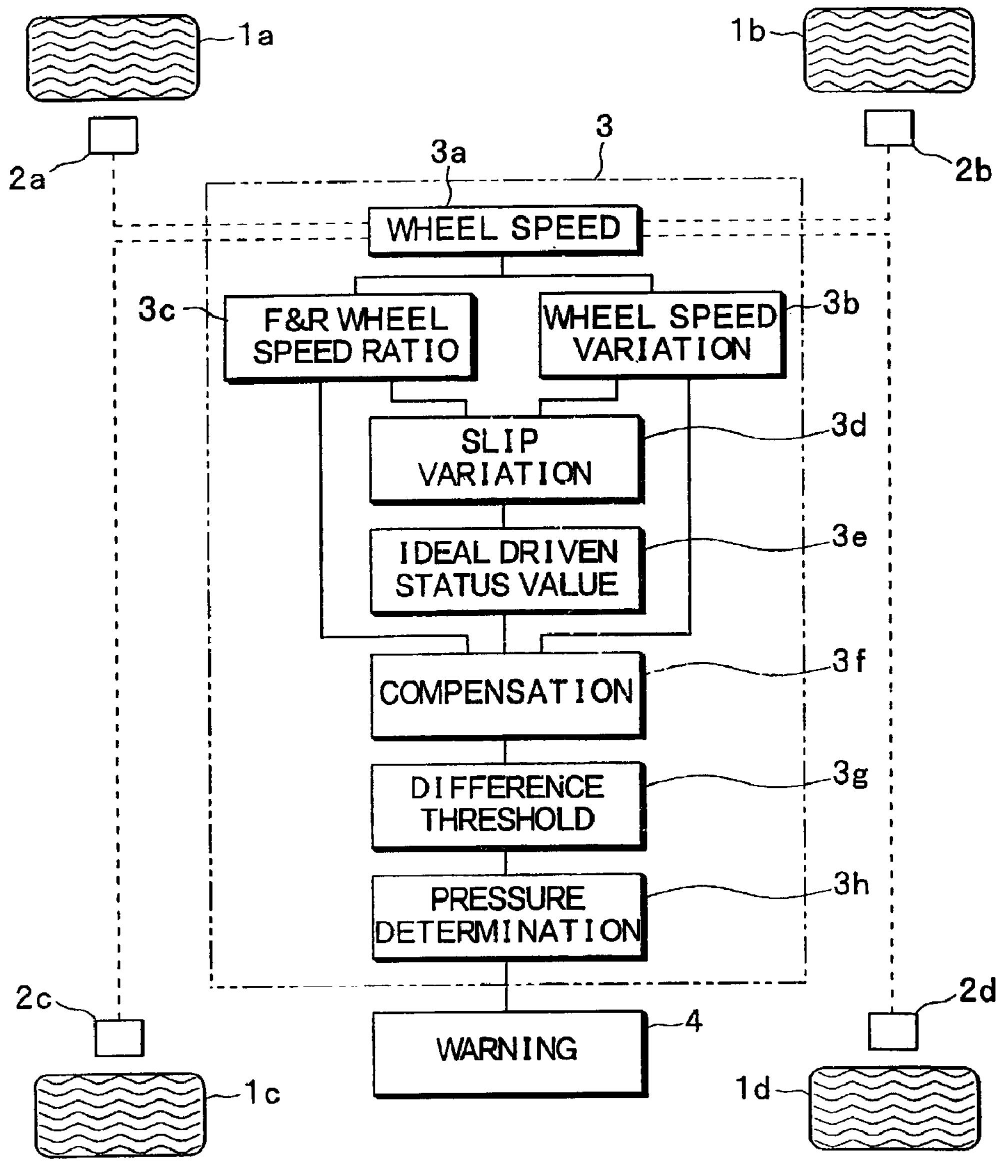
FIG. 6 is a schematic view showing a tire air pressure detection device according to a second embodiment of the present invention.

In a second embodiment of the present invention shown in FIG. 6, a tire air pressure detection device has a different construction from that of the first embodiment. As shown in FIG. 6, in this embodiment, the tire air pressure detection device is modified with respect to the tire air pressure detection device of the first embodiment.

In the tire air pressure detection device of the second embodiment, a slip variation processing portion 3*d* has a slip variation calculating portion and a slip variation memorizing portion. The slip variation calculating portion calculates slip variation A based on a wheel speed variation D and a front and rear wheel speed ratio β as in the first embodiment. The slip variation memorizing portion memorizes a reference slip variation Aold based on a calculation result of the slip variation calculating portion. The reference slip variation Aold corresponds to a latest slip variation A. For example, an initially calculated slip variation A is stored as the reference slip variation Aold, and a new slip variation A is then stored as the reference slip variation Aold.

An ideal driving status value calculating portion 3*e* calculates an ideal driving status value βid based on data stored in the slip variation memorizing portion of the slip variation processing portion 3*d*. Therefore, a post-compensation wheel speed variation $D'_{AVE}$ and the like are calculated based on the ideal driving status value βid calculated in above-described manner.

Figure 7:
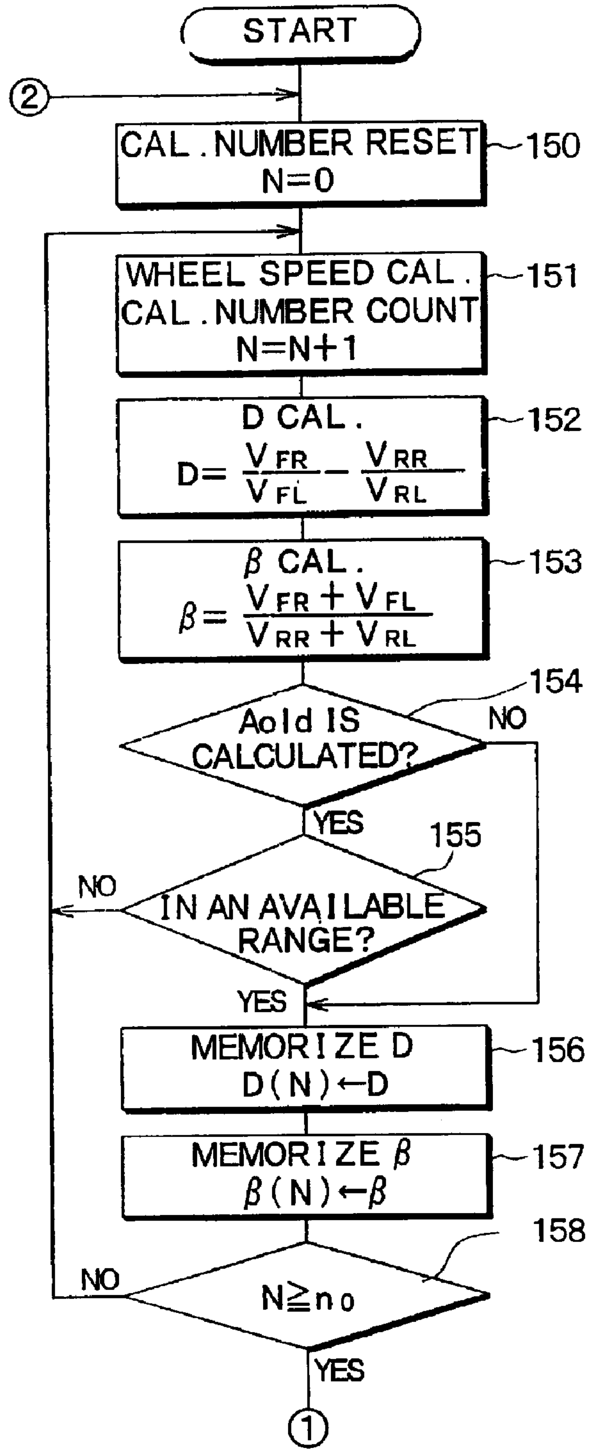
FIG. 7 is a flow diagram showing tire air pressure detection processing according to the second embodiment.
Figure 8:
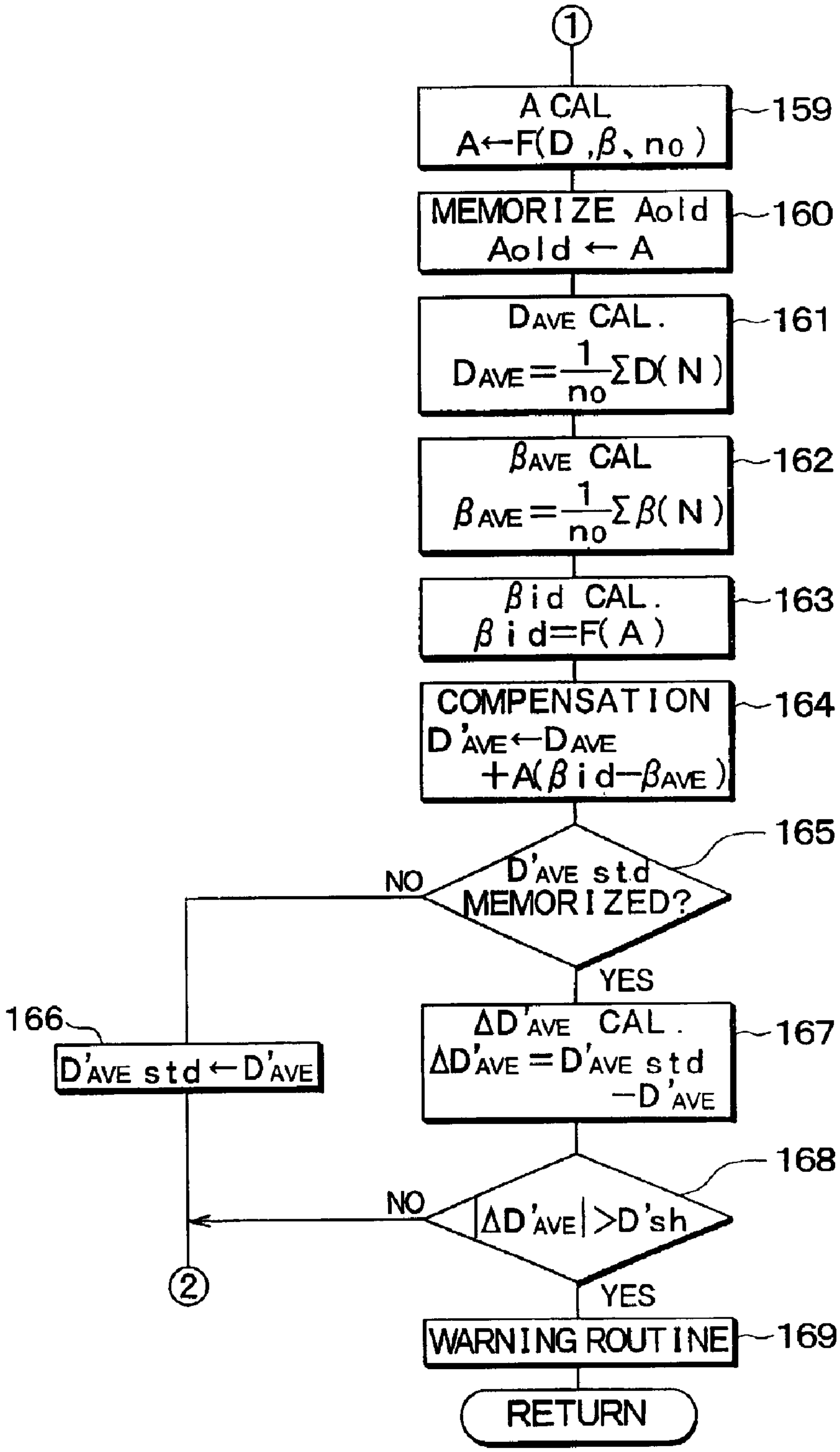
FIG. 8 is a flow diagram showing tire air pressure detection processing following FIG. 7.

Details of tire air pressure determination processing will now be described with reference to FIGS. 7 and 8.

At 150 through 172, processing for resetting a wheel speed calculation number N, increasing the wheel speed calculation number N, and calculating a wheel speed variation D are respectively executed as at 100 through 102 in the first embodiment. The processing advances to 153 to calculate a front and rear wheel speed ratio β. This processing is the same as at 104 in the first embodiment.

At 154, the CPU 3 determines whether the reference slip variation Aold has already been stored. For example, since the slip variation memorizing portion has memorized O before the reference slip variation Aold is memorized, the CPU 3 determines that the reference slip variation Aold has already been memorized when a value is memorized in the slip variation memorizing portion. This processing corresponds to regression line determining processing for determining whether a regression line is calculated, and is executed by a regression line determining portion (not shown) in the CPU 3. The processing advances to 155 when a determination by the CPU 3 is positive.

At 155, during available range determining processing, the CPU 3 determines whether the wheel speed variation D and the front and rear wheel speed ratio β relatively calculated at 152, 153 fall within an available range. This processing is executed by an available range determining portion (not shown) in the CPU 3 as will now be described with reference to FIG. 9. Calculation results of a relationship between the wheel speed variation D and the front and rear wheel speed ration β relatively calculated at 152, 153 are dotted in FIG. 9. A line A' is a regression line calculated at 159 as discussed later.

A calculation speed of the wheel speed variation D and the front and rear wheel speed ratio β relatively is sufficiently faster than a tire air pressure decrease speed when the tire air pressure decreases due to, for example, a puncture hole caused by a nail. Accordingly, calculation results during the tire air pressure decreases are dotted on or near the line A'.

Figure 9:
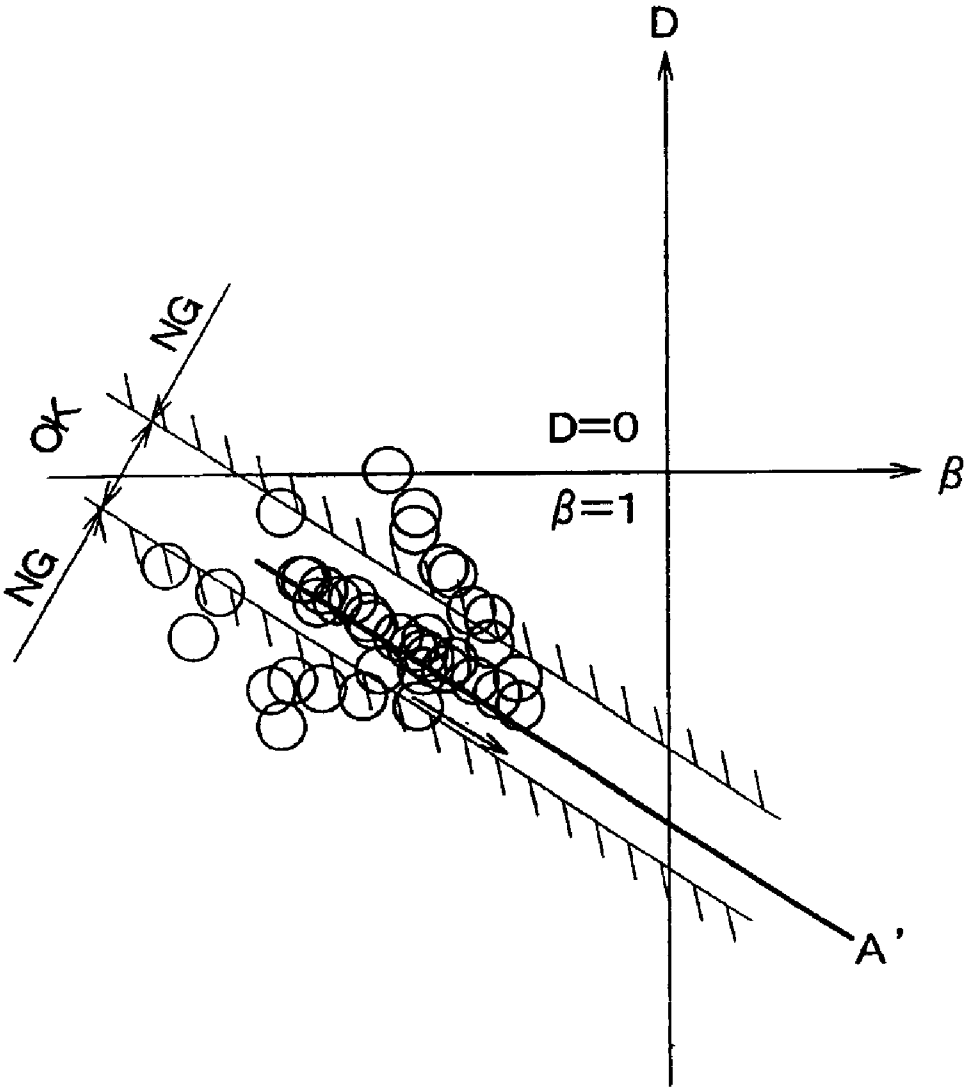
FIG. 9 is a schematic view showing a relationship between a regression line A' and an available range according to the second embodiment.

However, if at least one pair of vehicle wheels temporarily rotates with non-uniform (primarily caused when the vehicle turns), the calculation results are sometimes dotted to separate from the line A' as shown in FIG. 9. It is considerable that such calculation results include non-uniform components due to non-uniform rotation of vehicle wheels. Therefore, it is preferred that such calculation results be removed from data for calculating the regression line A'.

Accordingly, at 155, a region that includes the line A' and regions having a predetermined width on both sides of the line A' from the line A' defines the available range, and other regions that exceed the available range define a non-available range. Thus, in order to remove the calculation results within the non-available range, the processing returns at 151 when the calculation result is within the non-available range. Therefore, calculation results within the non-available range are not memorized at 156, 157 as discussed later.

On the other hand, the processing at 154 advances to 156, 157 when a determination by the CPU 3 is negative because the reference slip variation Aold is 0. At 156, the wheel speed variation D is memorized in the memory of the wheel speed variation memorizing portion to add data of the already memorized wheel speed variations D(N). At 157, the front and rear wheel speed ratio β is memorized in the memory of the front and rear wheel speed ratio memorizing portion to add to data to the already memorized front and rear wheel speed ratio β(N). This processing is the same as at 103, 105 in the first embodiment.

At 158, the CPU 3 determines whether the wheel speed calculation number N is larger than $n_0$ as at 106 in the first embodiment. The processing advances to 159 when a determination is positive, while returning at 151 when the determination is negative.

At 159, a slip variation A is calculated as at 107 in the first embodiment. The processing then advances to 160, where the slip variation A calculated at first is memorized in the slip variation memorizing portion of the slip variation processing portion 3*d* as the reference slip variation Aold.

At 161 through 169, processing as at 108 through 116 in the first embodiment is executed, and therefore the CPU 3 determines whether tire air pressure of some of the vehicle wheels 1*a*–1*d* decreases.

According to the tire air pressure detection device of the present embodiment, the calculation results within the non-available range are removed at 105 and are not memorized at 156, 157. Therefore, the calculation results including non-uniform components due to non-uniform rotation of vehicle wheels are not used as data for calculating the regression line A'. Accordingly, the accuracy of the calculation of a regression line does not decrease due to the non-uniform rotation of vehicle wheels. The slip variation A is accurately calculated, and therefore an ideal driving status value βid and a post-compensation wheel speed variation $D'_{AVE}$ are accurately calculated. A warning pressure is as a result uniformity.

Further, the post-compensation wheel speed variation $D'_{AVE}$, which corresponds to a wheel speed variation D under ideal driving status when a tire air pressure of at least one of the driven wheels 1*c*, 1*d* decreases, is calculated without excessive compensation. As a result, the post-compensation wheel speed variation $D'_{AVE}$ when the tire air pressure of the driven wheel decreases and that when the tire air pressure of the non-driven wheel decreases are identical value. Therefore, the warning pressure is uniform regardless of the type of wheel that decreases in pressure.

(Third Embodiment)

In a third embodiment, data within a region that is different from the non-uniform range defined in the second embodiment is removed. Incidentally, the configuration of a tire air pressure detection device of the third embodiment is the same as in the first and the second embodiments.

In the second embodiment, the results calculated when at least one pair of vehicle wheels temporarily rotates with non-uniform (mainly caused when the vehicle turns) are not used as data for calculating the regression line A'. In the present embodiment, the calculation results calculated during temporary tire slips or when shift shock of a transmission is generated are not used as data for calculating the regression line A'. For example, the calculation results of the front and rear wheel speed ratio β are sometimes smaller than a lower threshold corresponding to a lowest value of an appropriate range thereof when some of the vehicle wheels 1a–1d instantaneously slip or are larger than a uppermost threshold corresponding to a highest value of the appropriate range when noise is generated by shift shock of the transmission. In such cases, it is better to remove such calculation results from data for calculating the regression line A'.

Figure 10:
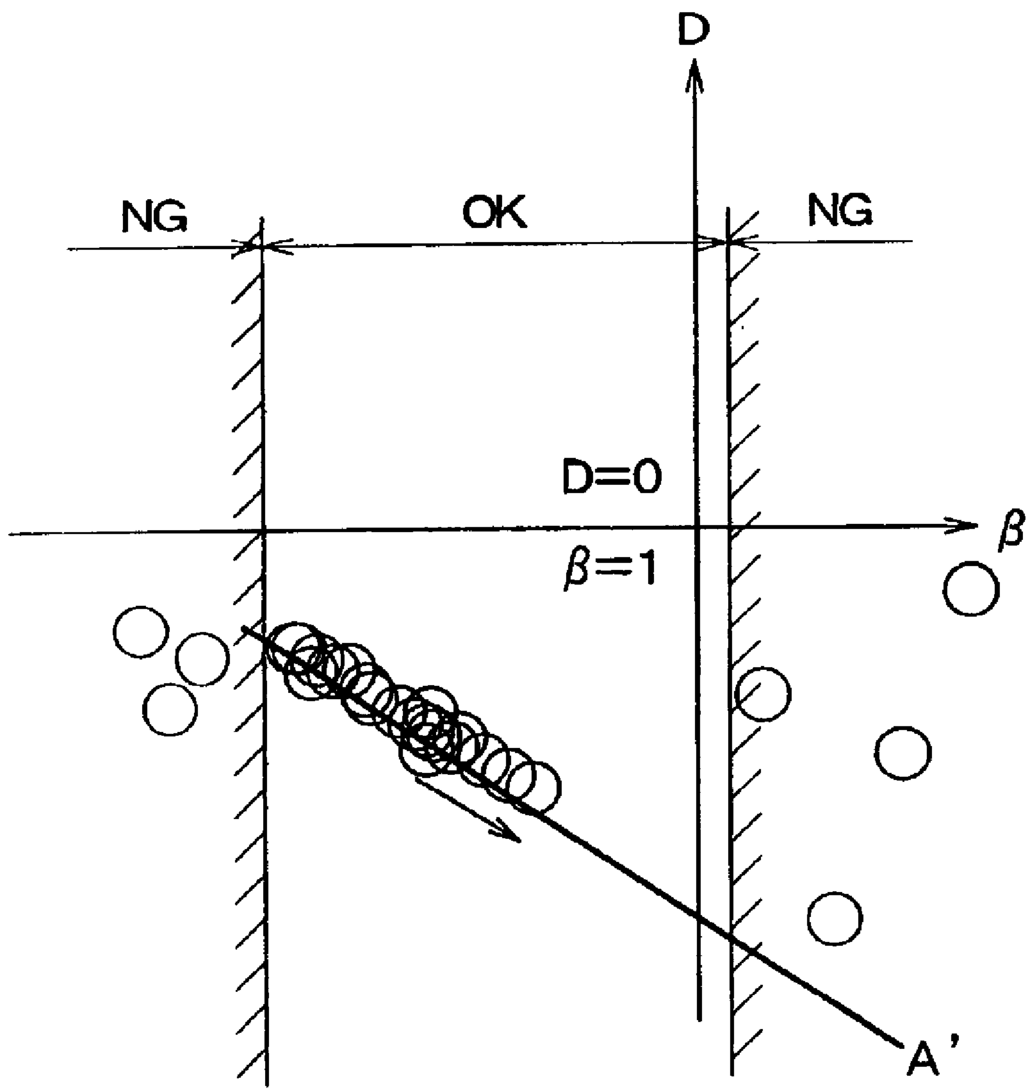
FIG. 10 is a schematic view showing a relationship between a regression line A' and an available range according to a third embodiment of the present invention.

Accordingly, as shown in FIG. 10, the lower and the higher thresholds of the front and rear wheel speed ratio β are defined, the region between the lower and the higher thresholds is defined as an available range, and other regions that fall outside the available range are defined as a non-available range.

Details of tire air pressure determination processing will now be described with reference to FIGS. 11 and 12.

Figure 11:
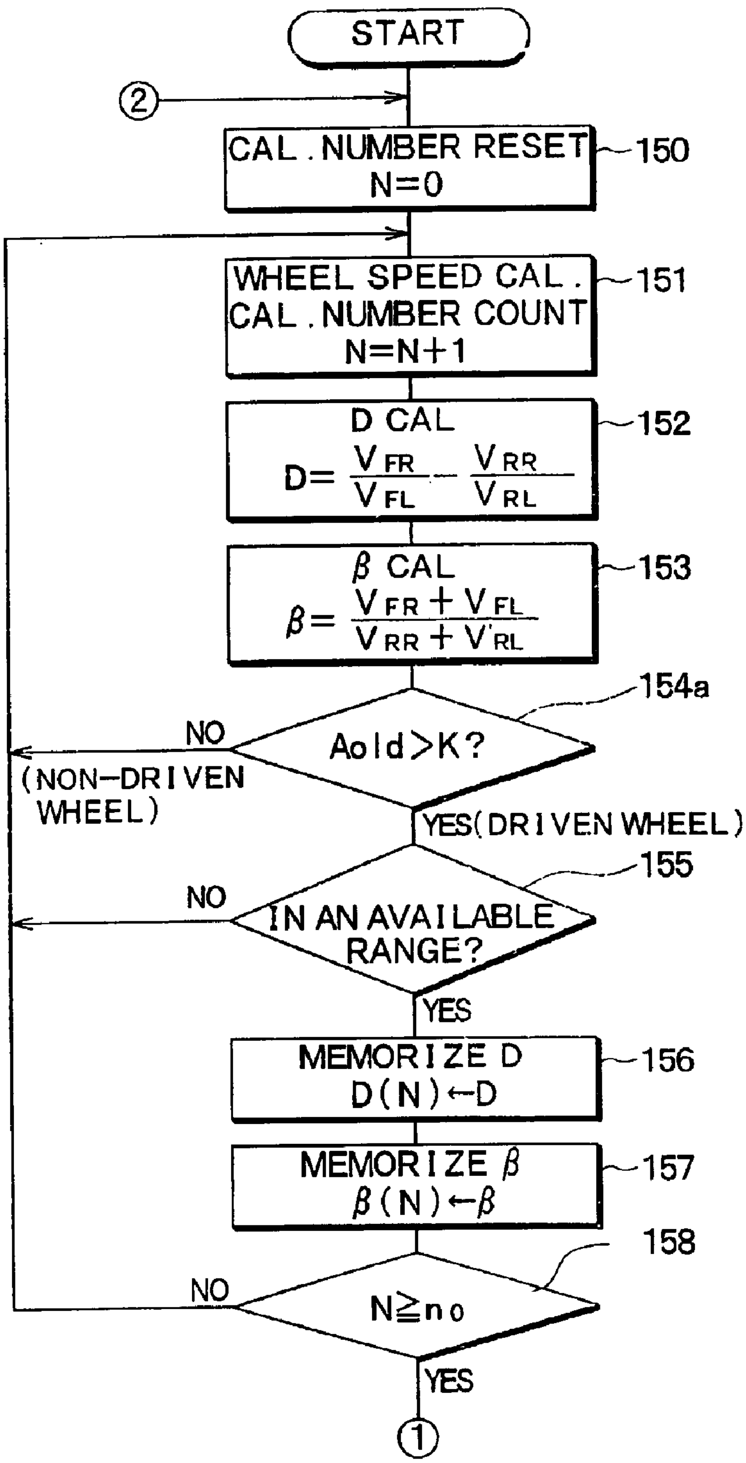
FIG. 11 a flow diagram showing tire air pressure detection processing according to the third embodiment.
Figure 12:
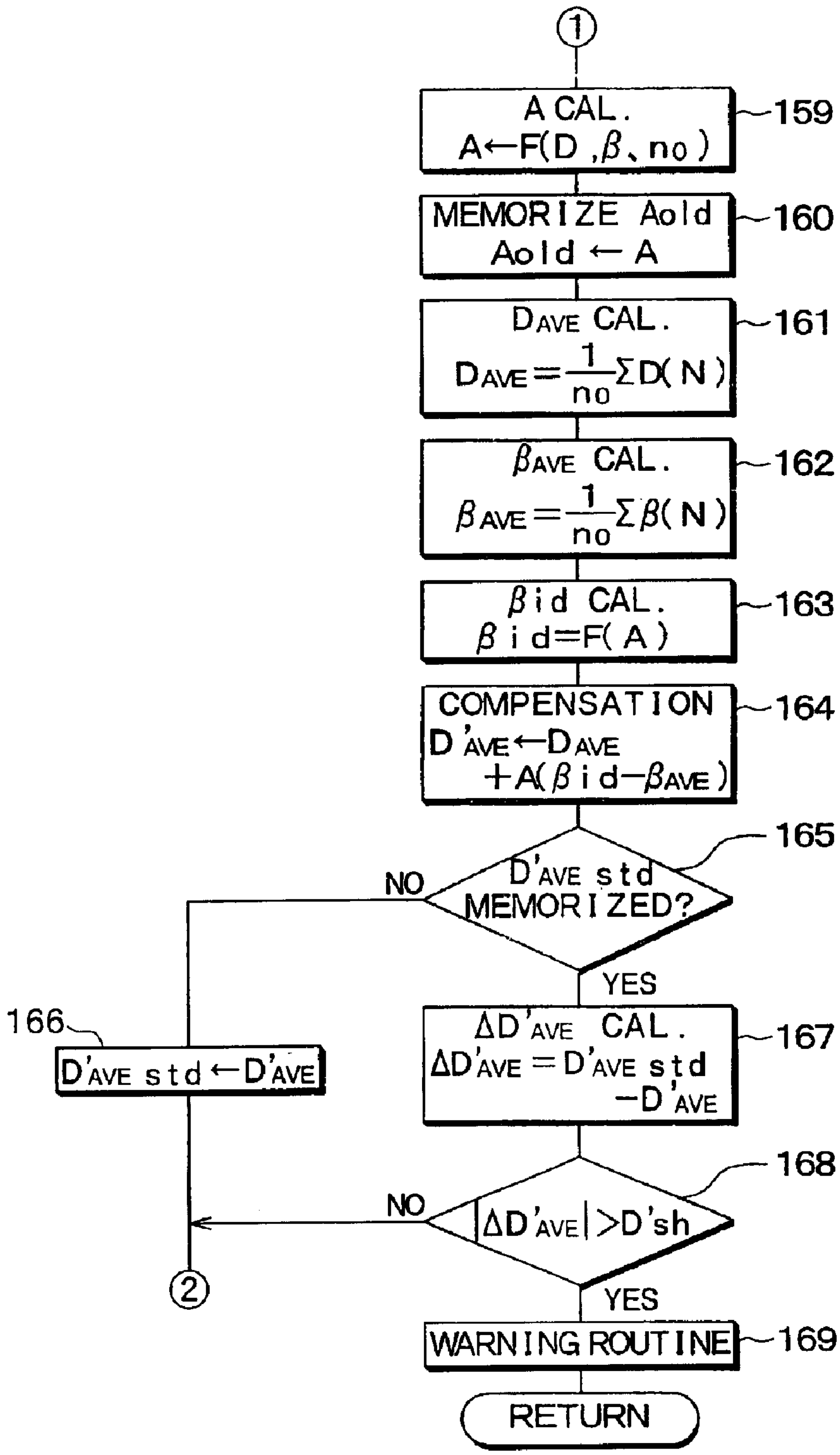
FIG. 12 is a flow diagram showing tire air pressure detection processing following FIG. 11.

Referring to FIGS. 11 and 12, in the tire air pressure determination processing of the present embodiment, the processing 154a and 155 is modified with respect to the processing 154 and 155 in the second embodiment.

At 154a, the CPU 3 determines whether a reference slip variation Aold memorized at 160 is larger than a predetermined threshold K. This processing is executed for determining whether a wheel in which tire air pressure decreases is a driven wheel or a non-driven wheel. A driven wheel determining portion (not shown) in the CPU 3 executes the processing.

For example, if a tire air pressure of one of the non-driven wheels 1a, 1b decreases, the front and rear wheel speed ratio β exceeds the higher threshold because wheel speeds $V_{FR}$, $V_{FL}$ of the non-driven wheels 1a, 1b are higher than wheel speeds $V_{RR}$, $V_{RL}$ of the driven wheels 1c, 1d. However, the calculation results do not include non-uniform components due to non-uniform rotation of vehicle wheels. Therefore, since the slope of a regression line (=slip variation A) is 0 when the tire air pressure of one of the non-driven wheels 1a, 1b decreases, the reference slip variation Aold is compared to the predetermined threshold K to remove calculation results from data for calculating the regression line A' only when the tire air pressure of one of the driven wheels 1c, 1d decreases.

When the reference slip variation Aold is smaller than the predetermined threshold K, the processing returns at 151 because a wheel in which tire air pressure decreases is one of the non-driven wheels 1a, 1b. When the reference slip variation Aold is larger than the predetermined threshold K, the processing advances to 155 because a wheel in which tire air pressure decreases is one of the driven wheels 1c, 1d.

At 155, during available range determining processing, the CPU 3 determines whether the front and rear wheel speed ratio β calculated at 153 falls within the available range. The processing advances to 156 and beyond when a determination at 155 is positive. To the contrary, the processing returns to 151 when the determination at 155 is negative. Thus, the calculation results within the non-available range are removed and are not memorized at 156, 157.

According to the tire air pressure detection device of the present embodiment, lower and higher thresholds of the front and rear wheel speed ratio β are defined when tire air pressure of one of the driven wheels decreases. Therefore, the calculation results including non-uniform components due to non-uniform rotation of vehicle wheels caused by temporary tire slippage or shift shock of a transmission are not used for calculating the regression line A'. Accordingly, the accuracy of the calculation of a regression line does not decrease due to the non-uniform rotation of vehicle wheels, and a warning pressure remains uniform.

(Fourth Embodiment)

In a fourth embodiment, data within a region that is different from the non-uniform ranges defined in the second and third embodiments is removed. Incidentally, the configuration of a tire air pressure detection device of the fourth embodiment is the same as in the third embodiment.

Figure 13:
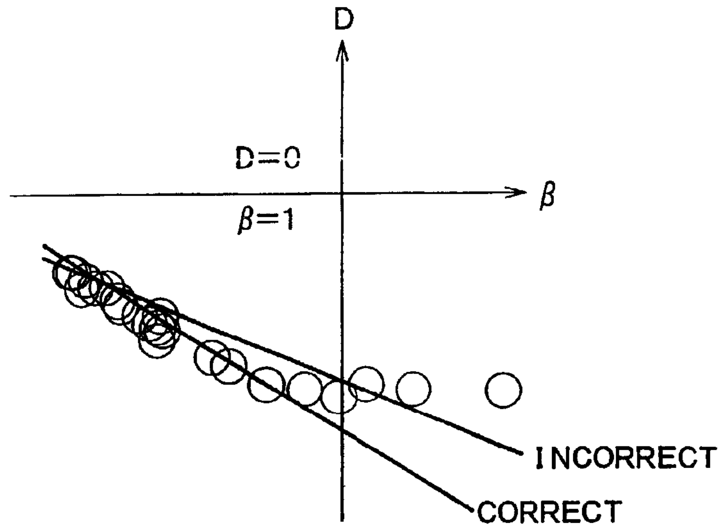
FIG. 13 is a schematic view showing a relationship between a wheel speed variation D and a front and rear wheel speed ratio β when noise is generated while wheel speed decreases.

In the present embodiment, the calculation results calculated when noise is generated (mainly caused by deceleration of a vehicle) are not used as data for calculating the regression line A'. For example, if the noise caused by deceleration occurs when tire air pressure of one of the driven wheels 1c, 1d decreases, the calculation results of a relationship between a wheel speed variation D and a front and rear wheel speed ratio β are dotted as shown in FIG. 13.

In general, the calculation results of the front and rear wheel speed ratio β are lower than a line of linear function (βid=F(A)) of an ideal driving status value βid when the tire air pressure of one of the driven wheels 1c, 1d decreases. However, the calculation results are sometimes higher than the line of the linear function when the noise caused by deceleration occurs. If such calculation results are used for calculating the regression line A', the regression line A' may be incorrect as shown in FIG. 13. Therefore, it is better to remove such calculation results from the data used for calculating the regression line A'.

Figure 14:
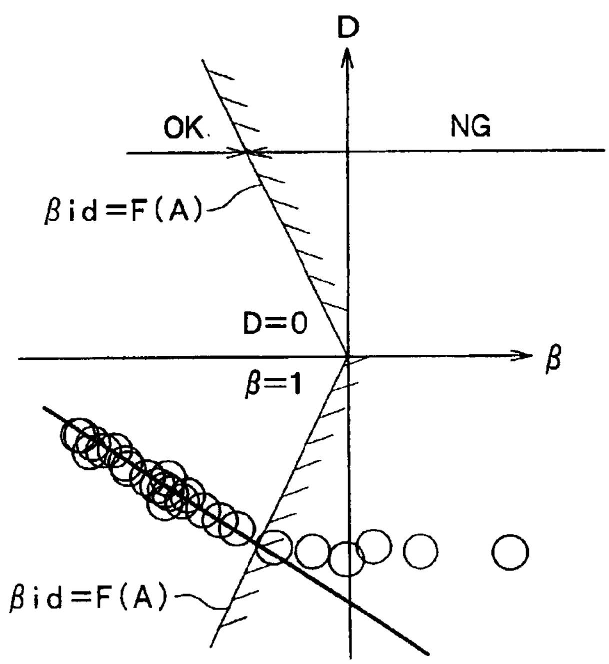
FIG. 14 is a schematic view showing a relationship between a regression line A' and an available range according to a fourth embodiment of the present invention.

Accordingly, as shown in FIG. 14, a region in which the front and rear wheel speed ratio β is lower than a line of a linear function (βid=F(A)) of an ideal driving status value βid is defined as an available range, and other regions that fall outside the available range are defined as a non-available range.

In this case, the tire air pressure detection processing as shown in FIGS. 11 and 12 in the third embodiment is executed. However, at 155 in FIG. 11, the available range is defined by the region in which the front and rear wheel speed ratio β is lower than a line of a linear function (βid=F(A)) of an ideal driving status value βid.

Incidentally, processing when the tire air pressure of one of the non-driven wheels 1a, 1b is the same as in the third embodiment. That is, calculation results when the tire air pressure of one of the driven wheels 1c, 1d decreases are only removed from the data for calculating the regression line A'.

(Fifth Embodiment)

Figure 15:
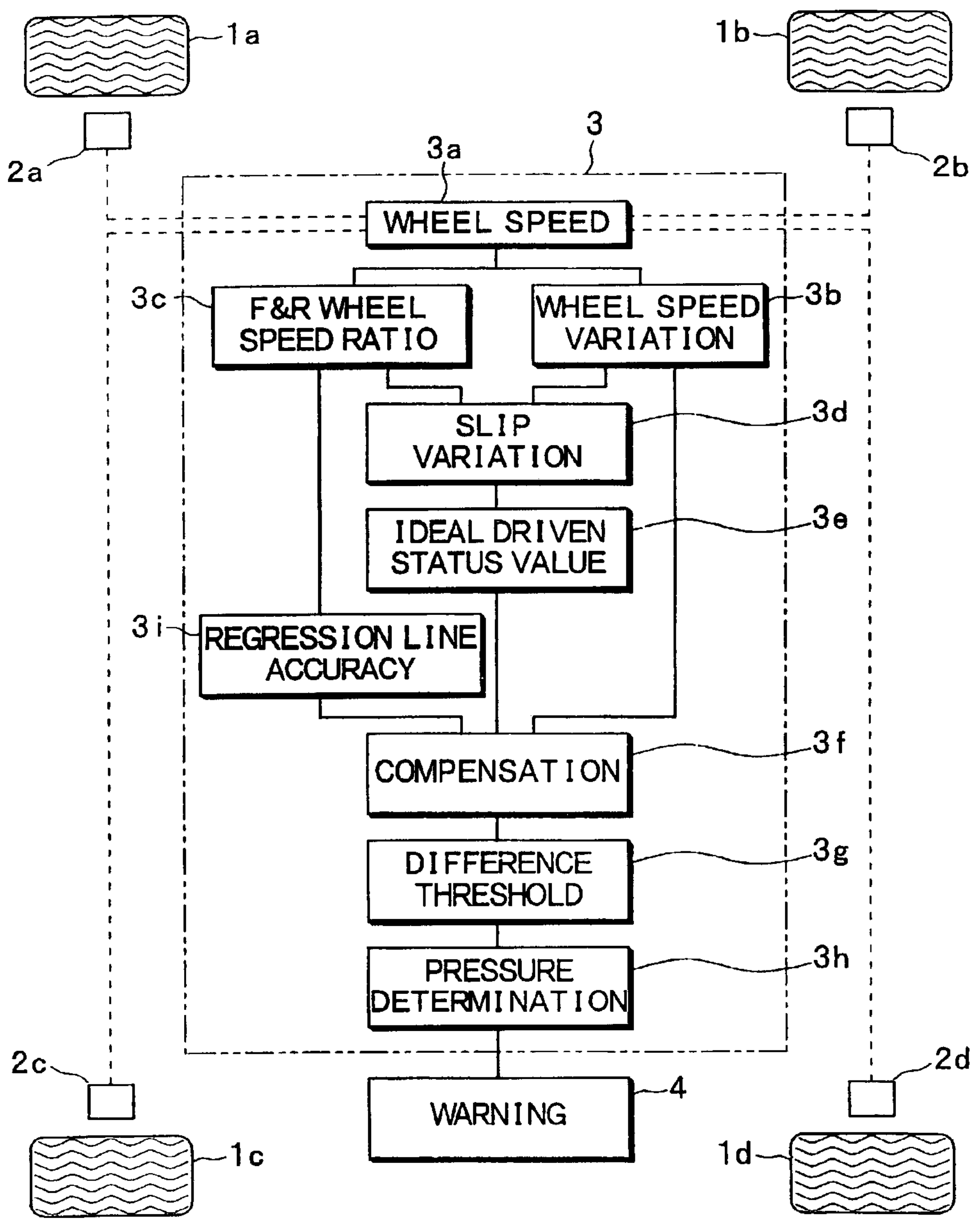
FIG. 15 is a schematic view showing a tire air pressure detection device according to a fifth embodiment of the present invention.

FIG. 15 is a schematic view showing a tire air pressure detection device according to a fifth embodiment of the present invention. The tire air pressure detection device is described with reference to FIG. 15. However, because the tire air pressure detection device has almost the same configuration as that of the first embodiment, and the tire air pressure determining processing is approximately the same as in the first embodiment, elements and processing different from the first embodiment will now be described.

The tire air pressure detection device of the present embodiment includes a regression line accuracy evaluating portion 3i. The regression line accuracy evaluating portion 3i calculates a slip variation AA that is used for calculating a post-compensation wheel speed variation average $D'_{AVE}$ based on data memorized in the front and rear wheel speed ratio memorizing portion of a front and rear wheel speed ratio processing portion 3c. Specifically, the regression line accuracy evaluating portion 3i evaluates a regression line accuracy based on a front and rear wheel speed ration β memorized in the front and rear wheel speed ratio memorizing portion. A current slip variation A is memorized as the slip variation AA if the regression line accuracy can increase, and a previous slip variation (=variation stock value A*) remains as the slip variation AA if the regression line accuracy cannot increase. A evaluation of the regression line is executed by determining whether a difference Ep between a maximum value and a minimum value of the front and rear wheel speed ratio β is larger than a predetermined reference value Ep*+Eth. The regression line accuracy evaluating portion **3*i*** corresponds to a non-uniform detecting portion for detecting non-uniform of driven forces and a slip variation memorizing portion for memorizing the slip variation A.

A wheel speed variation compensating portion in a wheel speed variation compensating processing portion **3*f* calculates a post-compensation wheel speed variation $D'_{AVE}$ based on the slip variation AA memorized in the regression line accuracy evaluating portion 3*i***. The post-compensation wheel speed variation $D'_{AVE}$ is calculated by the following equation (6), and a pressure difference determination value $\Delta D'_{AVE}$ and the like are calculated based on the post-compensation wheel speed variation $D'_{AVE}$.

$$D'_{AVE}=D_{AVE}+AA(\beta id-\beta_{AVE}) \quad (6)$$

Figure 16:
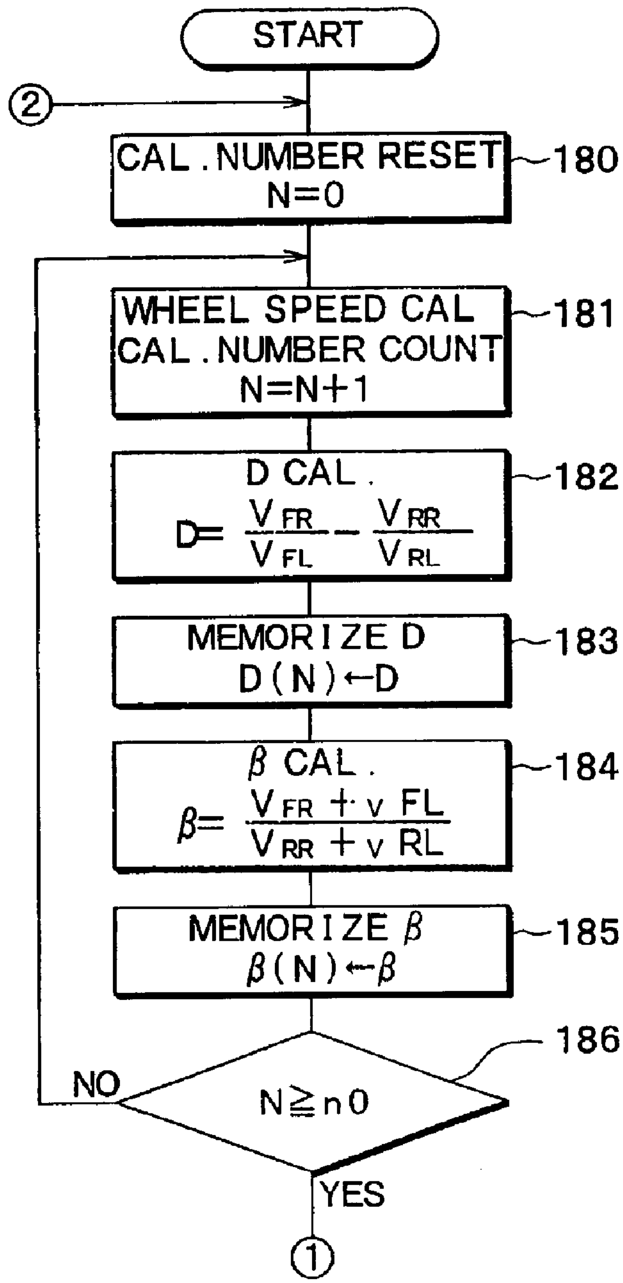
FIG. 16 is a flow diagram showing tire air pressure detection processing according to the fifth embodiment.

Details of tire air pressure determination processing will now be described with reference to FIGS. 16 and 17.

Figure 18:
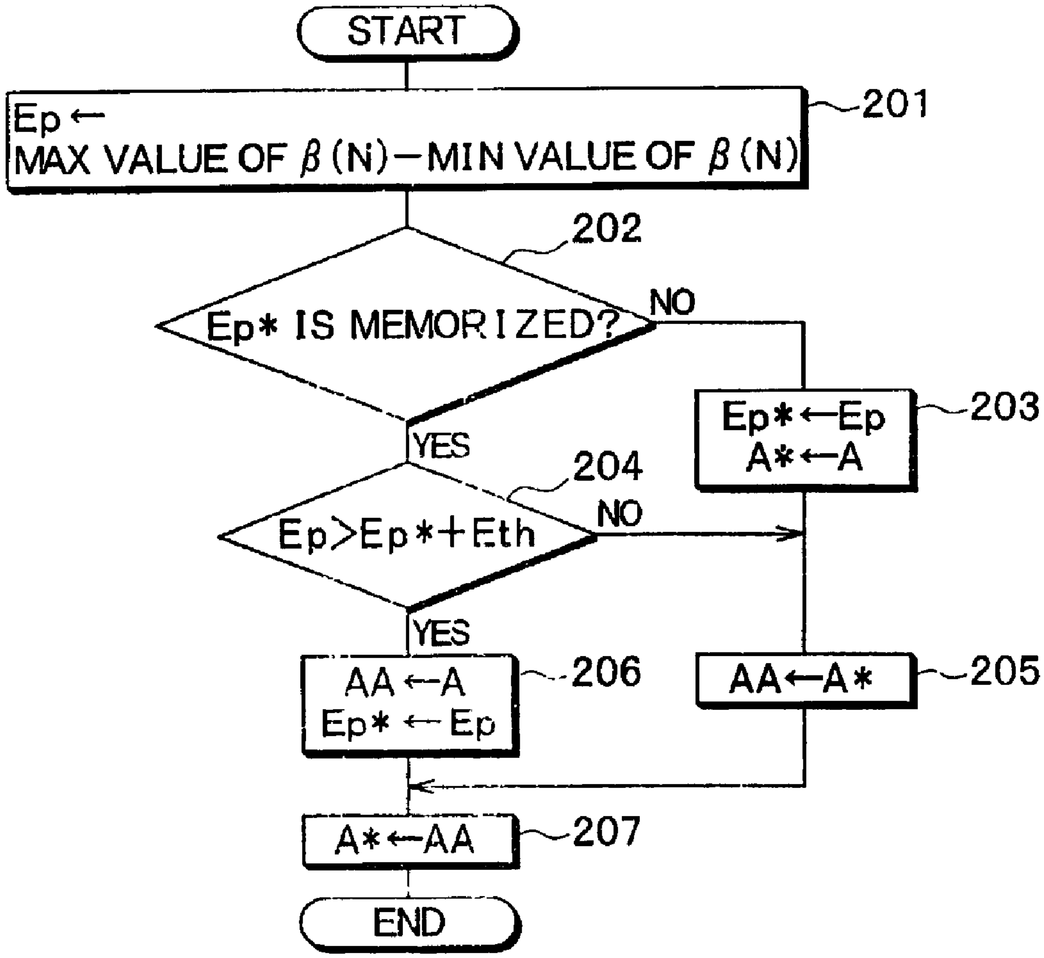
FIG. 18 is a flow diagram showing regression line evaluation value determination processing of FIG. 17.

At 180 through 190, processing as at 100 through 110 in the first embodiment is executed. The processing advances to 191 to execute regression line accuracy evaluating processing by regression line accuracy evaluating portion **3*i*. The regression line accuracy evaluating processing is described with reference to FIG. 18**.

At 201, during regression line accuracy evaluating processing, the regression line accuracy evaluating portion **3*i*** calculates a difference Ep between a maximum value and a minimum value of the front and rear wheel speed ratio β based on data memorized in the front and rear wheel speed ratio memorizing portion. The difference Ep corresponds to a determination reference value for determining whether non-uniform of the front and rear wheel speed ratio β occurs.

At 202, the regression line accuracy evaluating portion **3*i*** determines whether a difference stock value Ep* is memorized. That is, whether the difference Ep is calculated at least once or not is determined. The processing advances to 203 when a determination at 202 is negative to memorize the currently calculated difference Ep as the difference stock value Ep* and the slip variation A calculated at 187 as the variation stock value A* in the regression line accuracy evaluating portion **3*i*. The processing advances to 204 when the determination at 202 is negative. At 204, the regression line accuracy evaluating portion 3*i*** determines whether the difference Ep is larger than the predetermined reference value Ep*+Eth that corresponds to a value added the difference stock value Ep* and threshold Eth. The non-uniformity of the wheel driven force relates to the non-uniformity of the front and rear wheel speed ratio β. The front and rear wheel speed ratio β varies when the wheel driven force varies. Accordingly, the non-uniform of the wheel driven force is detected based on the non-uniform (=the difference Ep) of the front and rear wheel speed ratio β.

Figure 19A:
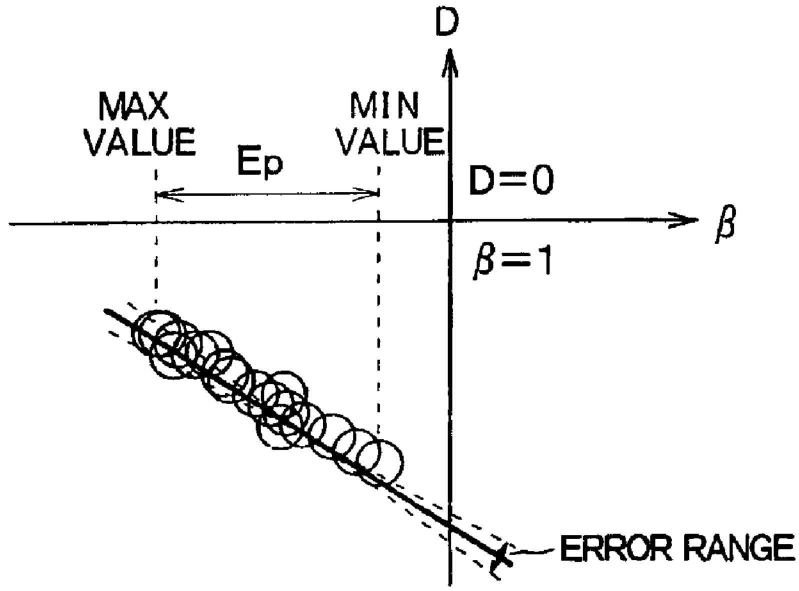
FIGS. 19A and 19B are schematic views showing respective relationships between a wheel speed variation D and a front and rear wheel speed ratio β when a wheel driven force non-uniformity is generated and is not generated according to the fifth embodiment.
Figure 19B:
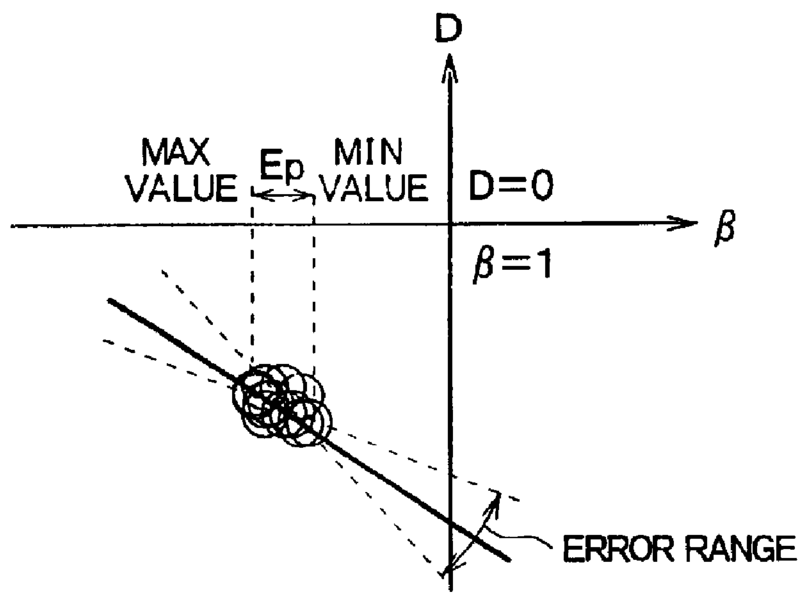

FIGS. 19A and 19A respectively show relationships between a wheel speed variation D and the front and rear wheel speed ratio β when non-uniform of wheel driven force respectively occurs and does not occur. As shown in FIGS. 19A and 19B, an error range of the slope of the regression line decreases when the non-uniform of the wheel driven force occurs, while it increases when the non-uniform of the wheel driven force does not occur. Therefore, the reliability of a slip variation A calculated when the non-uniform of the wheel driven force occurs is high, while that calculated when the non-uniform of the wheel driven force does not occur is not high.

Accordingly, the processing advances to 205 when a determination at 204 is negative because the non-uniform of the wheel driven force does not occur and the reliability may not be high. At 205, the regression line accuracy evaluating portion **3*i*** memorizes the variation stock value A* as the slip variation AA for calculating a post-compensation wheel speed variation average $D'_{AVE}$. To the contrary, the processing advances to 206 when the determination at 204 is positive because the non-uniform of the wheel driven force may occur and the reliability may be high. At 206, the regression line accuracy evaluating portion **3*i*** memorizes the slip variation A calculated now as the slip variation AA for calculating the post-compensation wheel speed variation average $D'_{AVE}$ and the difference Ep calculated now as the difference stock value Ep*.

Subsequently, the processing advances to 207. At 207, the regression line accuracy evaluating portion **3*i* memorizes slip variation AA memorized at 205 or 206** as the variation stock value A*. Thus, regression line accuracy evaluating processing is completed.

Figure 17:
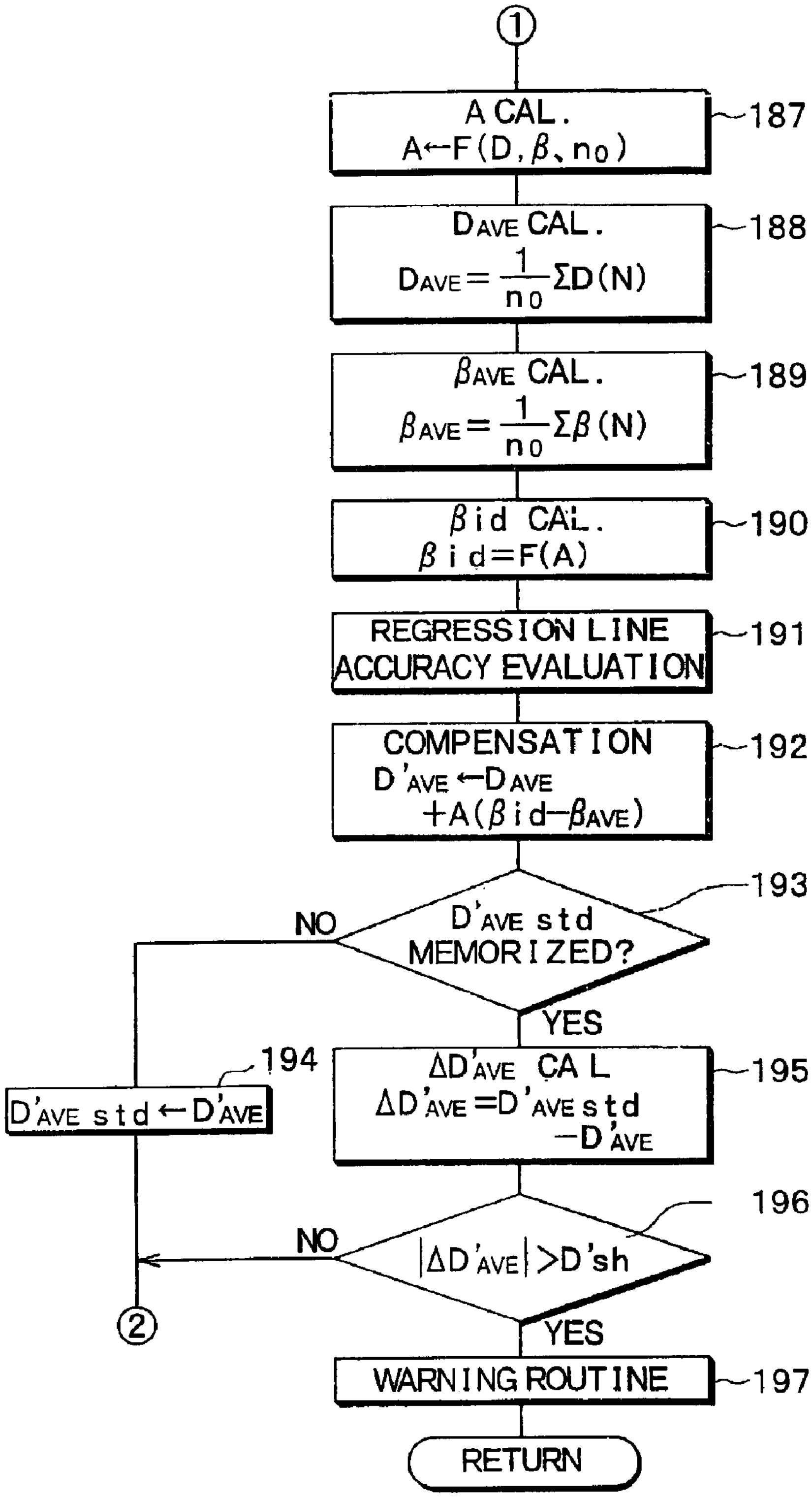
FIG. 17 is a flow diagram showing tire air pressure detection processing following FIG. 16.

Next, at 192 shown in FIG. 17, the post-compensation wheel speed variation average $D'_{AVE}$ is calculated based on the slip variation AA. Then, at 193–197, processing as at 112 through 116 in the first embodiment is executed, and therefore the CPU 3 determines whether tire air pressure of some of the vehicle wheels **1*a*–1*d*** decreases.

According to the tire air pressure detection device of the present embodiment, in regression line accuracy evaluating processing, whether non-uniform of a wheel driven force occurs or not is determined based on a difference Ep between a maximum value and a minimum value of the front and rear wheel speed ratio β. If a slip value A is calculated when the non-uniformity of a wheel driven force does not occur, it is not used for calculating a post-compensation wheel speed variation average $D'_{AVE}$. In this case, a slip value A calculated before the non-uniformity of a wheel driven force does not occur is applied as the slip value AA that is used for calculating a post-compensation wheel speed variation average $D'_{AVE}$. Therefore, even if the non-uniformity of a wheel driven force does not occur, a small amount of noise such as that caused by a vehicle slightly turning does not compromise the accuracy of the calculation of a regression line. As a result, a wheel speed variation D is appropriately compensated, and a decrease in tire air pressure can accurately be detected.

Incidentally, if a vehicle drives on a typical road, a time when the non-uniform of the wheel driven force is small is sufficiently shorter than a time when tire air pressure decreases. Accordingly, a tire air pressure decrease can be detected even if the slip value A calculated before the non-uniform of a wheel driven force does not occur is applied as the slip value AA that is used for calculating a post-compensation wheel speed variation average $D'_{AVE}$.

Further, the post-compensation wheel speed variation $D'_{AVE}$, which corresponds to wheel speed variation D under ideal driving status when the tire air pressure of at least one of the driven wheels **1*c*, 1*d*** decreases, is calculated without excessive compensation. As a result, the post-compensation wheel speed variation $D'_{AVE}$ when the tire air pressure of the driven wheel decreases and that when the tire air pressure of the non-driven wheel decreases are identical. Therefore, regardless of which type of tire experiences a decrease in tire air pressure, the warning pressure is uniform.

(Sixth Embodiment)

In the sixth embodiment, regression line accuracy evaluating processing is modified with respect to the fifth embodiment. Incidentally, the configuration of the tire air pressure detection device of the present embodiment is the same as in the first embodiment.

Detail of regression line accuracy evaluating processing will now be described with reference to FIG. 20.

Figure 20:
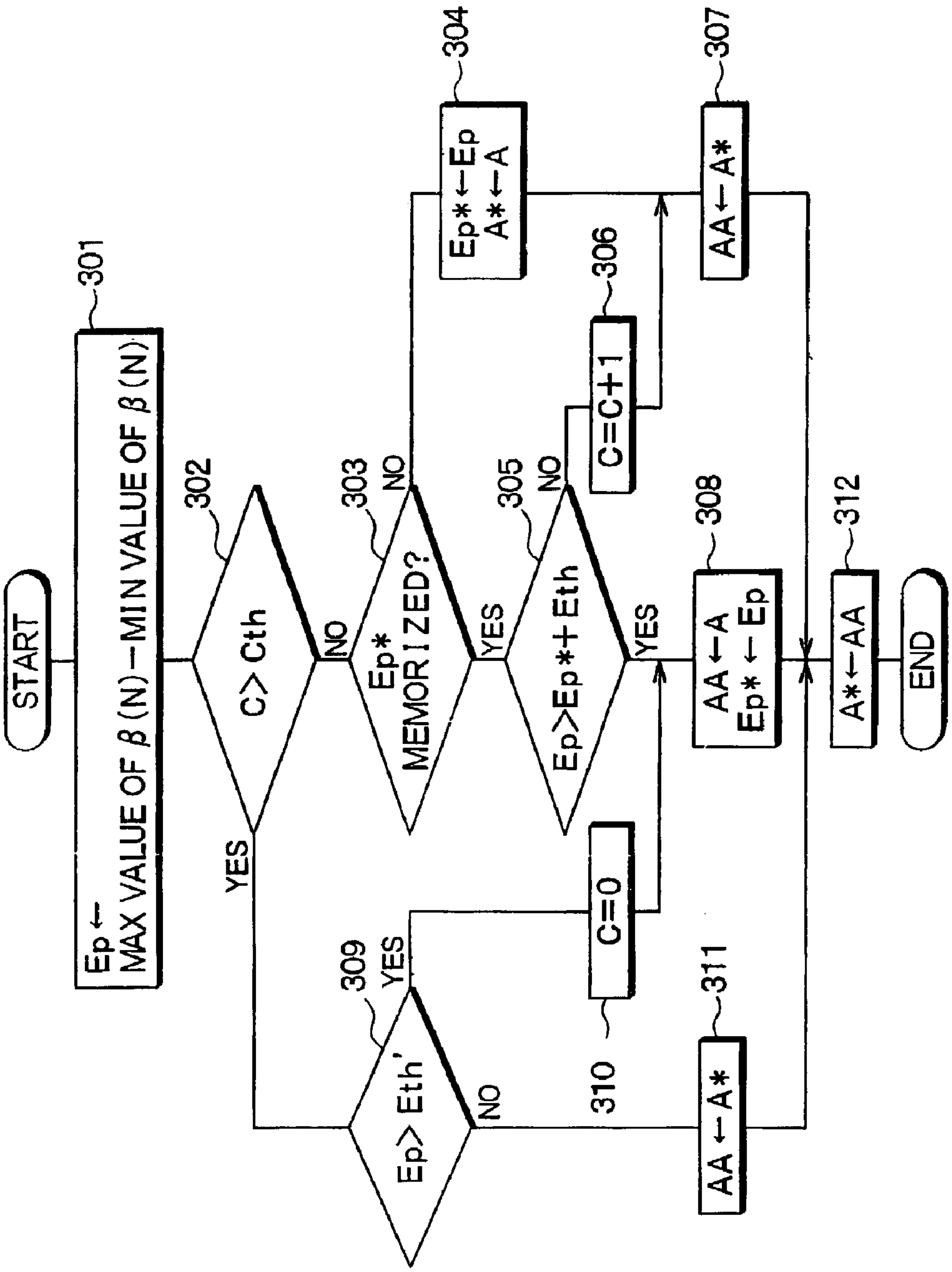
FIG. 20 is a flow diagram showing regression line evaluation value determination processing according to a sixth embodiment of the present art device.

As shown in FIG. 20, at 301, processing as at 201 in the fifth embodiment is executed to calculate a difference Ep between a maximum value and a minimum value of the front and rear wheel speed ratio β.

At 302, the CPU 3 determines whether the counted value of a counter (not shown) included therein is larger than a predetermined threshold Cth. That is, The CPU 3 determines whether a predetermined time (=predetermined threshold Cth) has passed from a time when a variation stock value A* is renewed.

The processing advances to 303 when a determination at 302 is negative. At 303, a regression line accuracy evaluating portion 3*i* determines whether a difference stock value Ep* is memorized as at 202 in the fifth embodiment. The processing then advances to 304 when a determination at 303 is negative. At 304, the regression line accuracy evaluating portion 3*i* memorizes the difference Ep calculated now as the difference stock value Ep* and the slip variation A calculated at 187 as the variation stock value A* as at 203 in the fifth embodiment. To the contrary, the processing advances to 305 when the determination at 303 is positive.

At 305, the regression line accuracy evaluating portion 3*i* determines whether the difference Ep is larger than a predetermined reference value Ep*+Eth as at 204 in the fifth embodiment. The processing advances to 306 and 307 when a determination is negative. At 306, the counts of counter is incremented. At 307, the regression line accuracy evaluating portion 3*i* memorizes the variation stock value A* therein as the slip variation AA as at 205 in the fifth embodiment. To the contrary, the processing advances to 308 when a determination is positive. At 308, the regression line accuracy evaluating portion 3*i* memorizes the slip variation A calculated now as the slip variation AA and the difference Ep calculated now as the difference stock value Ep* as at 206 in the fifth embodiment.

On the other hand, the processing advances to 309 when the determination at 302 is positive. At 309, the regression line accuracy evaluating portion 3*i* determines whether the difference Ep is larger than a predetermined threshold value Eth'. The predetermined threshold value Eth' is a value smaller than the predetermined reference value Ep*+Eth. The processing advances to 310 when a determination at 309 is positive to reset the count of the counter (count=0). The processing then advances to 308 to memorize the slip variation A calculated now as the slip variation AA and the difference Ep calculated now as the difference stock value Ep* in the regression line accuracy evaluating portion 3*i*. To the contrary, the processing advances to 311 when the determination at 309 is negative. At 311, the regression line accuracy evaluating portion 3*i* memorizes the variation stock value A* therein as the slip variation AA as at 307.

The processing then advances to 312 to memorize the slip variation AA memorized at 307, 308 or 311 as the variation stock value A* in the regression line accuracy evaluating portion 3*i*. Thus, regression line accuracy evaluating processing is completed.

According to the tire air pressure detection device of the present embodiment, when the determination at 305 is positive, a variation stock value A* is renewed at a slip variation A calculated now (at 308, 312). Further, when the variation stock value A* is not renewed if a predetermined time has passed, a difference Ep is compared with a predetermined threshold Eth' (at 309). Then, when the difference Ep is larger than the predetermined threshold Eth', the variation stock value A* is renewed by current slip value A. This is because the non-uniformity of the wheel driven force is small, but the regression line can be calculated accurately to some degree.

Therefore, the situation in which variation stock value A* is not renewed for a long time, and the sage pf data that is too old for detecting a tire air pressure decrease, can be avoided. As a result, tire air pressure decrease can be detected more accurately.

(Seventh embodiment)

Figure 21:
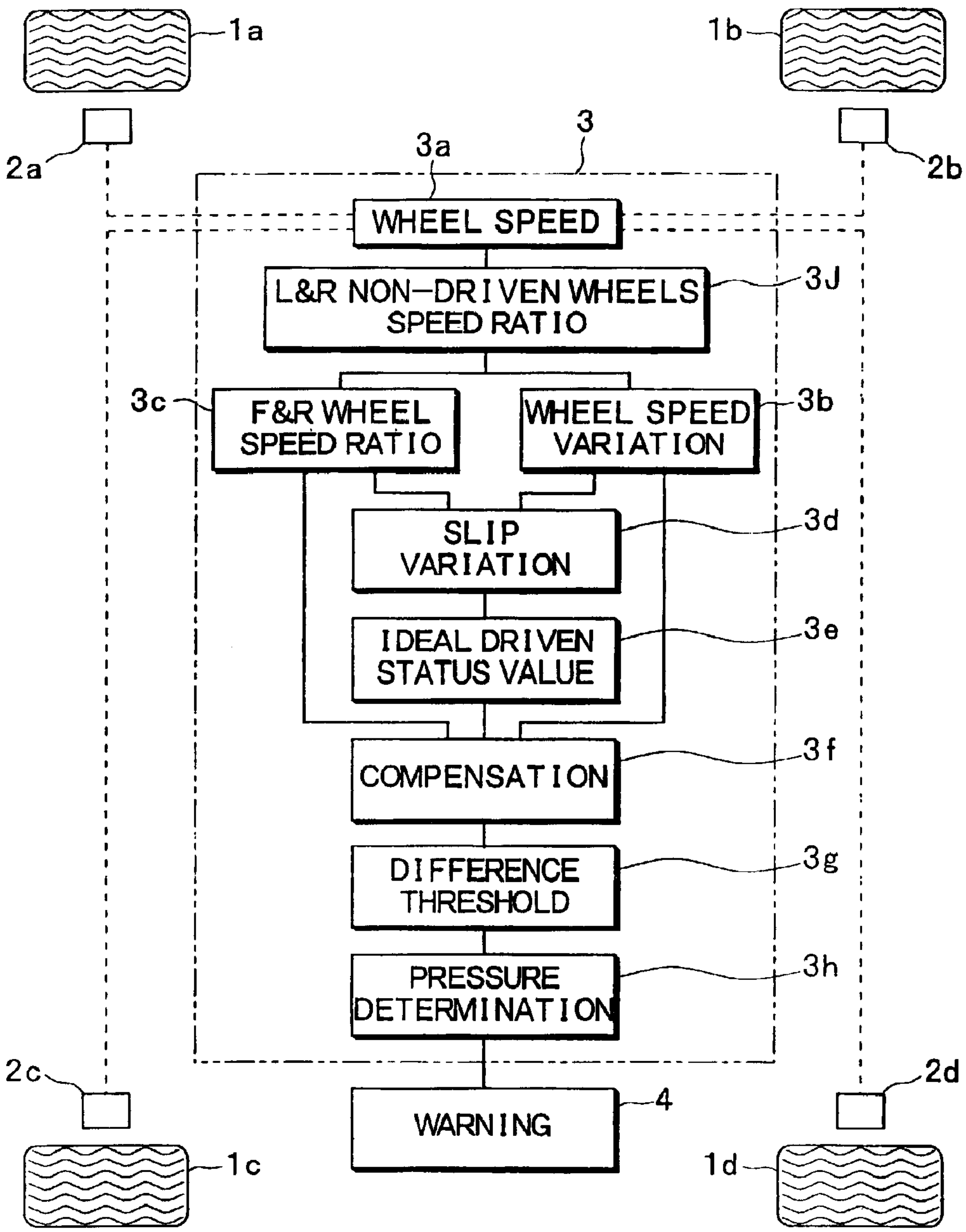
FIG. 21 is a schematic view showing a tire air pressure detection device according to a seventh embodiment of the present invention.

FIG. 21 is a schematic view showing a tire air pressure detection device according to a seventh embodiment of the present invention. The tire air pressure detection device is described with reference to FIG. 21. However, because the tire air pressure detection device has almost the same configuration as in the first embodiment, and the tire air pressure determining processing is approximately the same as in the first embodiment, only elements and processing different from the first embodiment will now be described.

The tire air pressure detection device of the present embodiment includes a left and right non-driven wheel speed ratio processing portion 3*j*. The left and right non-driven wheel speed ratio processing portion 3*j* includes a left and right non-driven wheel speed ratio calculating portion, a left and right non-driven wheel speed ratio determining portion, a left and right non-driven wheel speed ratio memorizing portion, and a left and right non-driven wheel speed ratio averaging portion.

The left and right non-driven wheel speed ratio calculating portion selects non-driven wheels speeds ($V_{FL}$, $V_{FR}$) from respective wheel speeds calculated by a wheel speed calculating portion 3*a* and calculates a left and right non-driven wheel speed ratio R. Specifically, the left and right non-driven wheel speed ratio R is calculated using the equation $R=V_{FR}/V_{FL}$.

The left and right non-driven wheel speed ratio determining portion determines whether the left and right non-driven wheel speed ratio R is in an available range. Thus, the left and right non-driven wheel speed ratio R within the available range is selected, while that outside of the available range is removed. A selection of the left and right non-driven wheel speed ratio R is executed by a selecting portion (not shown) in the CPU 3. When the left and right non-driven wheel speed ratio R is determined in the available range, it is memorized in the left and right non-driven wheel speed ratio memorizing portion.

The available range is defined based on an average value $R_{AVE}$ of the left and right non-driven wheel speed ratio R that is calculated by the left and right non-driven wheel speed ratio averaging portion. Specifically, a range including from the average value $R_{AVE}$ minus Rw to the average value $R_{AVE}$ plus Rw ($R_{AVE}-Rw<R<R_{AVE}+Rw$) is defined as the available range. The average value $R_{AVE}$ of the left and right non-driven wheel speed ratio R is expressed by the following equation.

$$R_{AVE} = \frac{1}{n_0}\sum R(N) \tag{7}$$

Figure 22:
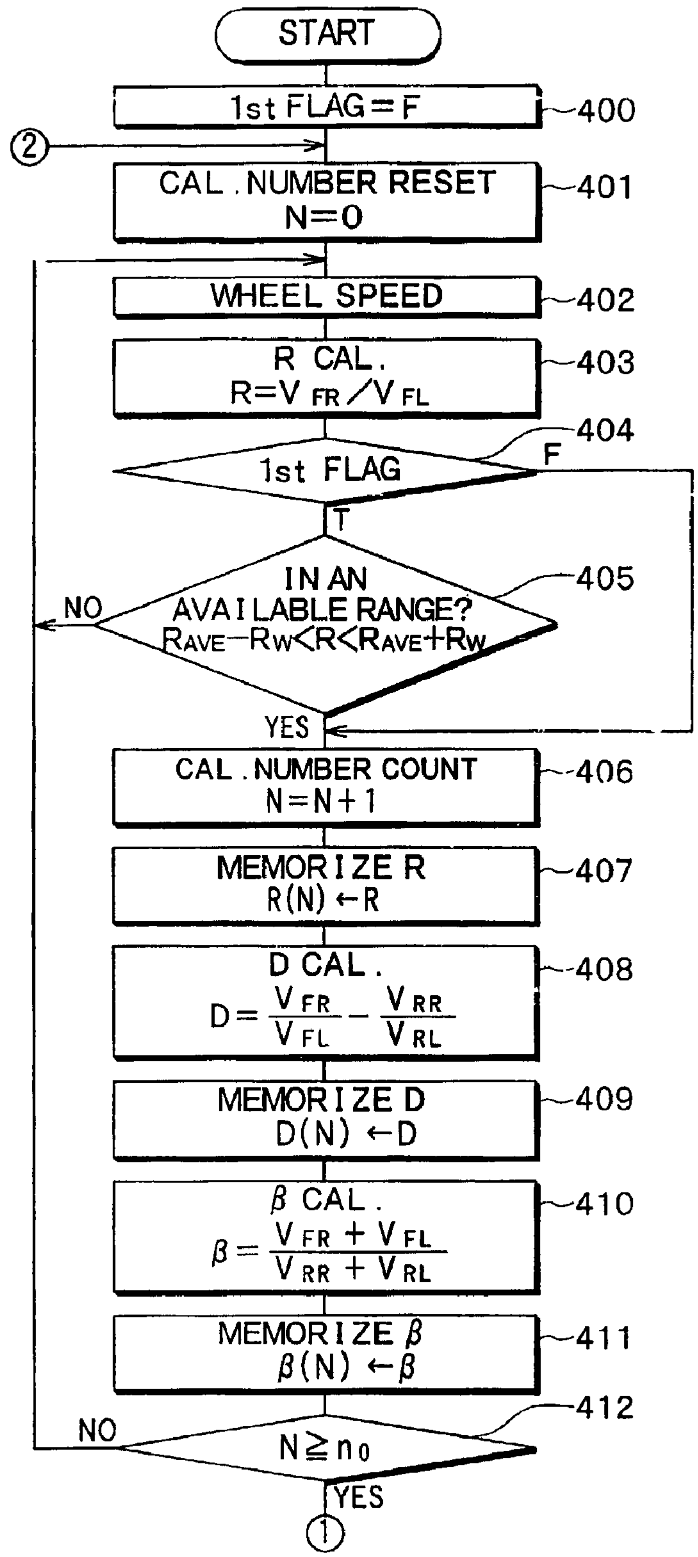
FIG. 22 is a flow diagram showing tire air pressure detection processing according to the seventh embodiment.
Figure 23:
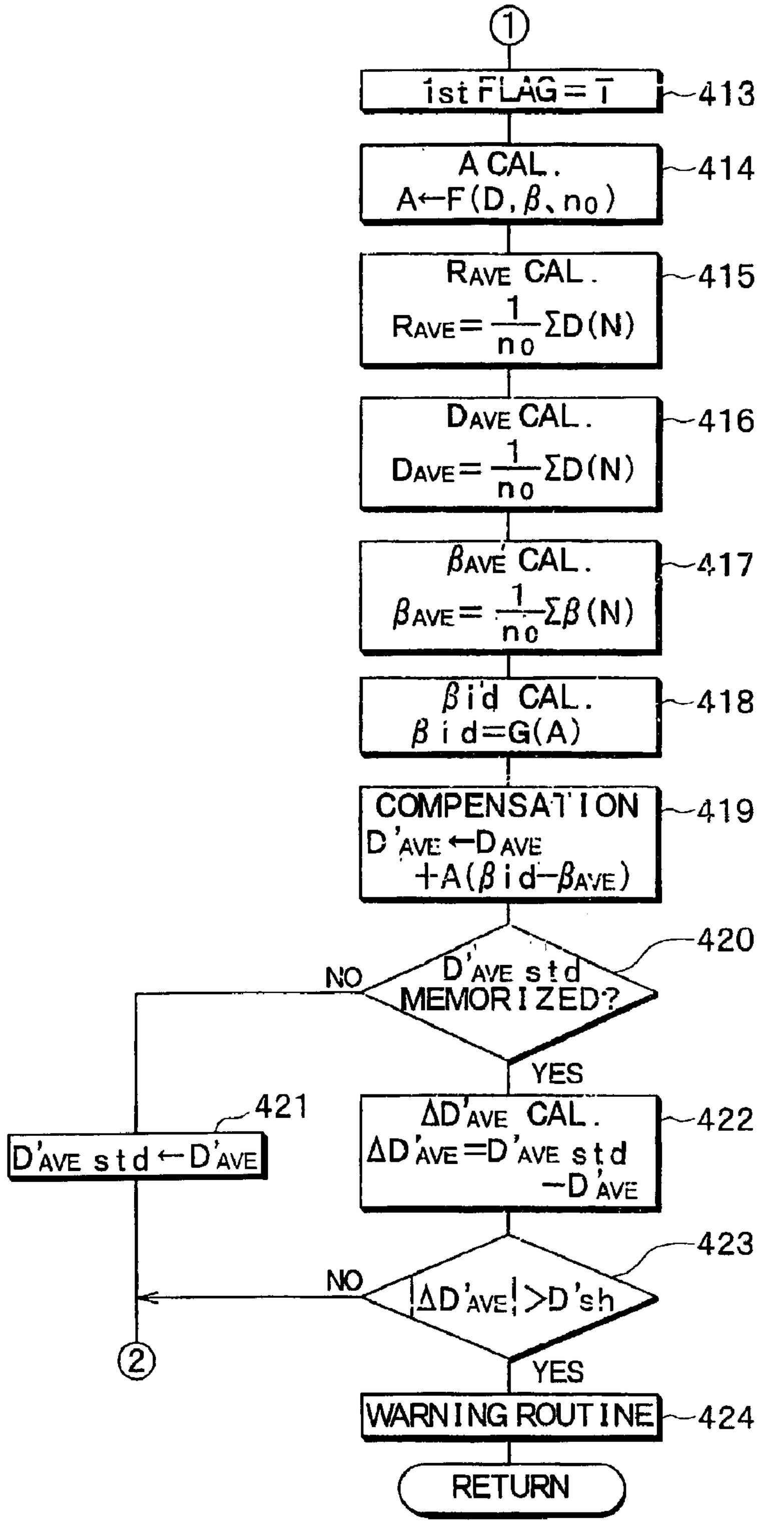
FIG. 23 is a flow diagram showing tire air pressure detection processing following FIG. 22.

Detail of tire air pressure determination processing will now be described with reference to FIGS. 22 and 23.

At 400, a 1st flag is set in F. The 1st flag expresses whether a calculation executed as follows is executed for the first time. That is, the calculation is executed for the first time when the 1st flag is F, while it is not executed for the first time when the 1st flag is T. The 1st flag is set in T if a wheel speed calculation number N reaches $n_0$ one time as shown at 412, 413.

At 401 and 402, as at 100 and 101 in the first embodiment, the wheel speed calculation number N is reset (N=0), and respective vehicle wheel speeds $V_{FL}$, $V_{FR}$, $V_{RL}$ and $V_{RR}$ are calculated.

At 403, non-driven wheel speeds ($V_{FL}$, $V_{FR}$) are selected from respective wheel speeds calculated at 402, and a left and right non-driven wheel speed ratio R is calculated based on the non-driven wheel speeds. At 404, whether the 1st flag is f or T is determined. The processing advances to 405 when the 1st flag is T, or advances to 406 when the 1st flag is F.

At 405, the left and right non-driven wheel speed ratio determining portion determines whether the left and right non-driven wheel speed ratio R calculated at 403 is in the available range ($R_{AVE}$−Rw<R<$R_{AVE}$+Rw). The processing advances to 406 when a determination at 405 is positive, or returns to 402 when the determination is negative. This processing corresponds to data selecting processing to remove data outside of the available range and select data within the available range.

At 406, the wheel speed calculation number N is incremented. The processing then advances to 407 to memorize the left and right non-driven wheel speed ratio R within the available range, in the left and right non-driven wheel speed ratio memorizing portion to add currently memorized left and right non-driven wheel speed ratio R(N). Incidentally, R(N) corresponds an arrangement of $n_0$ portions of the left and right non-driven wheel speed ratio R to memorize $n_0$ portions of left and right non-driven wheel speed ratio R into a position of the memory corresponding to a calculated number. The left and right non-driven wheel speed ratio memorizing portion re-memorizes a new left and right non-driven wheel speed ratio R into the position of the memory corresponding to wheel speed calculation number N when, for example, the wheel speed calculation number N is reset at 401 after the $n_0$ portions of the left and right non-driven wheel speed ratio R are memorized.

At 408 through 412, processing as at 102 through 106 in the first embodiment is executed, and the processing then advances to 413. At 413, the 1st flag is set in T to express that the calculation is not being executed for the first time.

Next, at 414, processing as at 107 in the first embodiment is executed to calculate a slip variation A. The processing then advances to 415, and the average value $R_{AVE}$ of the left and right non-driven wheel speed ratio R is calculated. The average value $R_{AVE}$ of the left and right non-driven wheel speed ratio R is calculated by substituting respective left and right non-driven wheel speed ratios R memorized at 407 into the equation (7).

Next, at 416 through 424, processing as at 108 through 116 in the first embodiment is executed, and therefore the CPU 3 determines whether the tire air pressure of some of the vehicle wheels 1$a$–1$d$ decreases.

Figure 24:
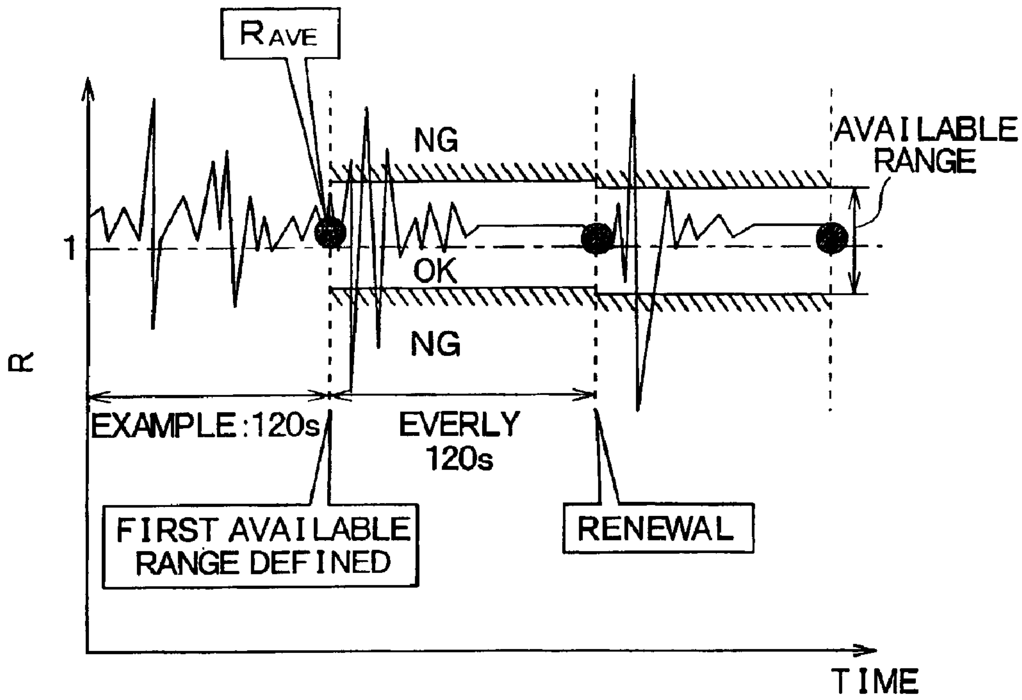
FIG. 24 is a timing diagram showing a relationship between a left and right non-driven wheel speed ratio R and an available range according to the seventh embodiment.

According to the tire air pressure detection device of the present embodiment, the left and right non-driven wheel speed ratios R outside of the available range are removed and thus are not used for calculating a regression line, and those ratios within the available range are used for calculating the regression line. For example, a relationship between the left and right non-driven wheel speed ratios R and the available range is shown in FIG. 24. The available range is not defined until the wheel speed calculation number N is $n_0$, but is renewed every time when the wheel speed calculation number N is $n_0$. In addition, when calculated left and right non-driven wheel speed ratio R is outside the available range, its data is not memorized in the first wheel speed variation memorizing portion and the front and rear wheel speed ratio memorizing portion.

Figure 25:
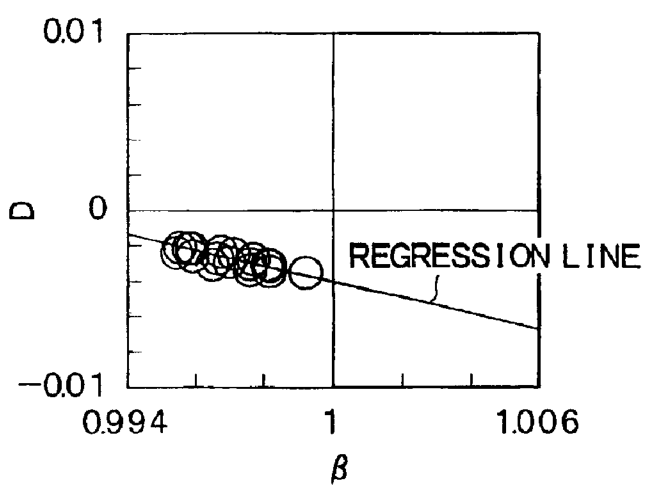
FIG. 25 is a schematic view showing a relationship between a wheel speed variation D and a front and rear wheel speed ratio β after data is selected according to the seventh embodiment.
Figure 26:
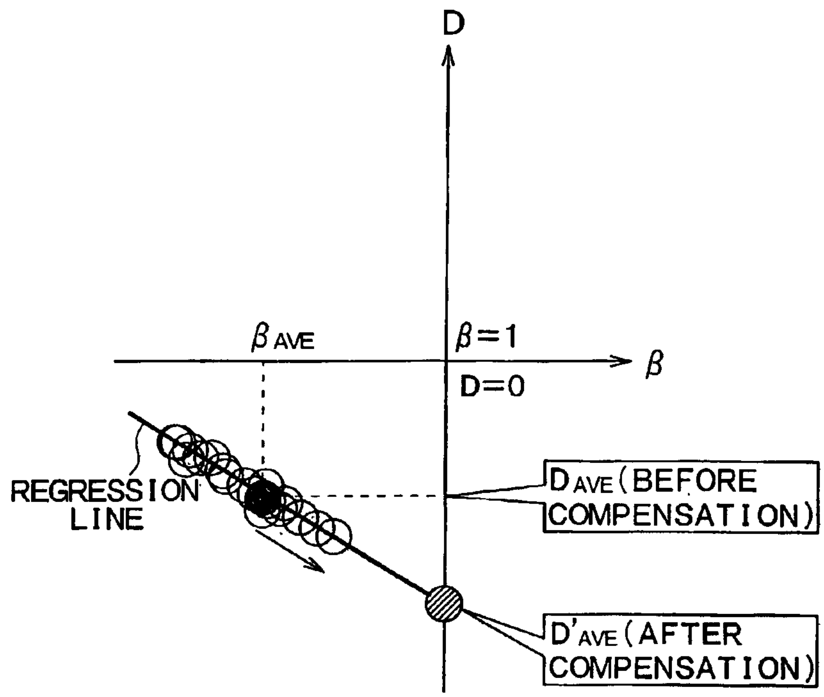
FIG. 26 is a schematic view showing an average $D_{AVE}$ and a post-compensation wheel speed variation average $D'_{AVE}$ according to a related art device.
Figure 27:
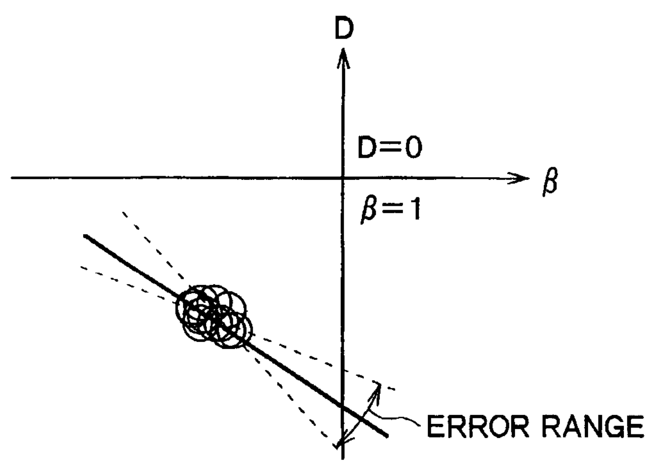
FIG. 27 is a schematic view showing a regression line when a small noise due to slight vehicle turning is generated according to the related invention.
Figure 28:
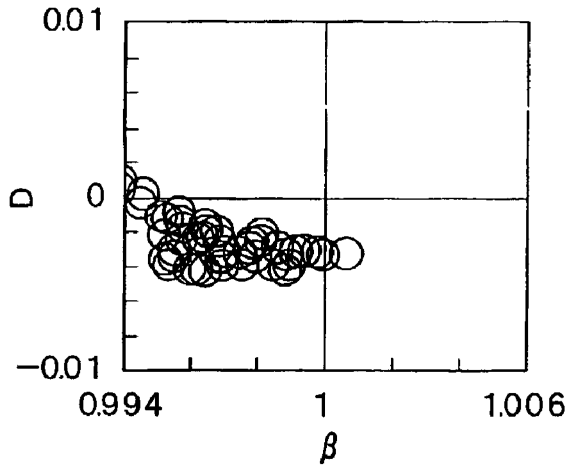
FIG. 28 is a schematic view showing a relationship between a wheel speed variation D and a front and rear wheel speed ratio β including turning data according to the related art device.
Figure 29:
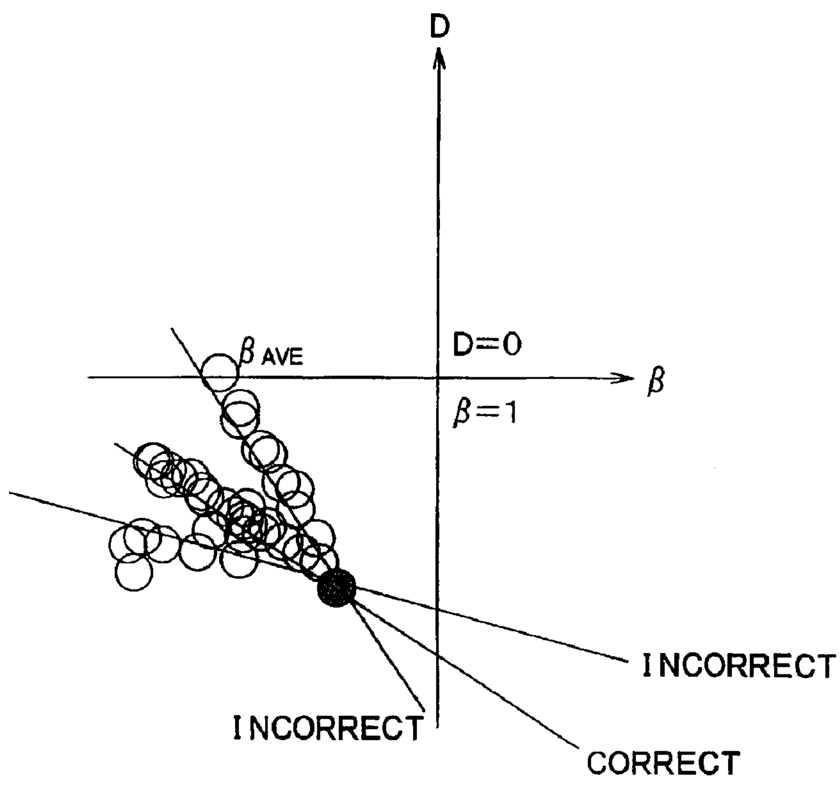
FIG. 29 is schematic view showing regression lines calculated based on the data of FIG. 28.

Therefore, referring to FIG. 25, adopted data does not included at a when the vehicle turns. Thus, an accurate regression line is calculated based on the adopted data. Accordingly, the accuracy of the calculation of a regression line does not decrease due to the non-uniform of wheel speed variation D caused by events such as vehicle turns and a warning pressure is uniform.

Further, the post-compensation wheel speed variation $D'_{AVE}$, which corresponds to a wheel speed variation D under ideal driving status when a tire air pressure of at least one of the driven wheels 1$c$, 1$d$ decreases, is calculated without excessive compensation. As a result, the post-compensation wheel speed variation $D'_{AVE}$ when the tire air pressure of the driven wheel decreases and that when the tire air pressure of the non-driven wheel decreases are identical. Therefore, regardless of the type of wheel experiencing a decrease in tire pressure, the warning pressure is uniform.

(Modification)

In the first to seventh embodiments, respective tire air pressure detection devices are adapted for use in a rear wheel drive vehicle, but can alternatively be adapted for use in a front wheel drive vehicle. In this case, an ideal driving status value βid is at least 1 with respect to the tire air pressure decrease of a driven wheel.

In the first to seventh embodiments, the wheel speed variation D is calculated as a rotational status value using equation (1). However, other equations can alternatively be used for calculating the rotational status value. That is, the rotational status value is a value expressing a relationship of respective wheels 1$a$–1$d$ so as to cancel a wheel speed variation between left and right wheels generated due to vehicle turns. For example, the following equations can be used for the calculation.

$$D = \frac{V_{RR}}{V_{RL}} - \frac{V_{FR}}{V_{FL}} \tag{8}$$

$$D=(V_{FR}+V_{RL})-(V_{FL}+V_{RR}) \tag{9}$$

$$D = \frac{\frac{V_{FR}+V_{RL}}{2} - \frac{V_{FR}+V_{RR}}{2}}{\frac{V_{FR}+V_{FL}+V_{RR}+V_{RL}}{4}} \tag{10}$$

Those above equations express relationships of respective wheels 1$a$–1$d$ so as to cancel wheel speed variations between left and right wheels generated due to vehicle turns by calculating differences between left front and rear wheel speeds and between right front and rear wheel speeds. This is because wheel speed variations may be generated between the left front and rear wheel speeds and between right front and rear wheel speeds.

Regarding a tire air pressure detection device that warns of a tire air pressure decrease when a wheel speed variation D exceeds a predetermined threshold, compensation for the wheel speed variation D caused by tire slippage is unnecessary if a slip variation (a slope of a regression line) A is small due to the following reasons. When the tire air pressure decreases in one of the rear wheels (i.e., driven wheels), a slight error is allowed because the wheel speed variation D does not exceed the predetermined threshold when the slip variation A is small. In addition, when the tire air pressure decreases in one of the front wheels (i.e., non-driven wheels), the slip variation A is approximately zero. Therefore, upon removing the compensation when the slip variation A is small, it is possible to remove data when compensation is not needed even if a tire air pressure of one of the rear wheels decreases and when a tire air pressure of one of the front wheels decreases.

In the first to seventh embodiments, the post-compensation wheel speed variation $D'_{AVE}$ is calculated by putting the average value $D_{AVE}$ on the regression line expressed by βid=F(A) after the average value $D_{AVE}$ is calculated. However, the post-compensation wheel speed variation $D'_{AVE}$ may be calculated by putting the respective wheel speed variations D on the regression line by βid=F(A) and averaging them.

In the first to seventh embodiments, the average value $D_{AVE}$, the average value $\beta_{AVE}$, difference determination value $\Delta D'_{AVE}$ and the absolute value $|\Delta D'_{AVE}|$ are calculated based on $n_0$ portions of the wheel speed variations D and the front and rear wheel speed ratios β when the wheel speed calculation number N reaches $n_0$. However, in this case, a tire air pressure decrease is not detected until all $n_0$ portions of data are renewed. Accordingly, upon moving average, a tire air pressure decrease can be detected even if all $n_0$ portions of data are not renewed. The moving average renews the oldest data of the wheel speed variations D and the front and rear wheel speed ratios D memorized in the wheel speed variation memorizing portion and the front and rear wheel speed ratio memorizing portion. Then, the average value $D_{AVE}$ and the average value $\beta_{AVE}$ are periodically calculated when one of the wheel speed variations D and one of the front and rear wheel speed ratios β are renewed.

Incidentally, in the second to seventh embodiments, the compensation of the rotational status value (i.e., the wheel speed variation D) is executed based on the ideal driving status value βid (=F(A)). However, the above-mentioned regression line accuracy evaluating processing can alternatively be adapted for other tire air pressure detection device that uses a compensation methodology disclosed by the already discussed related art device.

While the above description is of the preferred embodiments of the present invention, it should be appreciated that the invention may be modified, altered, or varied without deviating from the scope and fair meaning of the following claims.

What is claimed is:

1. A tire air pressure detection device comprising:

a vehicle wheel speed detecting portion (2a–2d, 3a) for detecting respective vehicle wheel speeds;

a rotational status value calculating portion (3b) for calculating a rotational value (D) expressing a relationship of the respective vehicle wheel speeds to cancel a wheel speed variation between left and right wheels generated due to vehicle turns;

a slip status value calculating portion (3c) for calculating a slip status value (β) based on the vehicle wheel speeds detected by the vehicle wheel speed detecting portion, the slip status value depending on a slip status between driven wheels and non-driven wheels;

a regression line calculating portion (3d) for calculating a regression line that is a linear function expressing a relationship between the rotational status value calculated by the rotational status value calculating portion and the slip status value calculated by the slip status value calculating portion;

an ideal driving status calculating portion (3e) for calculating an ideal status value (βid) corresponding to a slip value under an ideal driving status without tire slippage;

a rotational status value compensating portion (3f) for calculating an ideal rotational status value under the ideal driving status without tire slippage based on the regression line calculated by the regression line calculating portion and the ideal slip status value calculated by the ideal driving status calculating portion; and a tire air pressure decrease detecting portion (3h) for detecting a tire air pressure decrease based on the ideal rotational status value calculated by the rotational status value compensating portion.

2. The tire air pressure detection device according to claim 1, wherein the rotational status value compensating portion calculates the ideal rotational status value by assuming a rotational status value if the slip status value is the ideal status value based on the regression line calculated by the regression line calculating portion.

3. The tire air pressure detection device according to claim 1, further comprising:

a rotational status value averaging portion (3b) for calculating a rotational status value average ($D_{AVE}$) of the rotational status value calculated by the rotational status value calculating portion; and a slip status value averaging portion (3c) for calculating a slip status value average ($\beta_{AVE}$) of the slip status value calculated by the slip status value calculating portion;

wherein the rotational status value compensating portion calculates the ideal rotational status value by compensating for the rotational status value average calculated by the rotational status value averaging portion and the slip status value average calculated by the slip status value averaging portion based on the regression line calculated by the regression line calculating portion.

4. The tire air pressure detection device according to claim 1, wherein the rotational status value calculating portion calculates a wheel speed variation (D) corresponding to a difference in wheel speed ratios of each pair of wheels located diagonally from each other.

5. The tire air pressure detection device according to claim 1, wherein the slip status value calculating portion calculates a front and rear wheel speed ratio (β) corresponding to a ratio of vehicle wheel speeds of front wheels and vehicle wheel speeds of rear wheels.

6. The tire air pressure detection device according to claim 1, wherein the rotational status value calculating portion calculates a wheel speed variation (D) corresponding to a difference of wheel speed ratios of each pair of wheels located diagonally from each other, the slip status value calculating portion calculates a front and rear wheel speed ratio (β) corresponding to a ratio of vehicle wheel speeds of front wheels and vehicle wheel speeds of rear wheels, and the regression line calculating portion calculates a change value (A) of the wheel speed variation with respect to the front and rear wheel speed ratio.

7. The tire air pressure detection device according to claim 1, wherein the ideal driving status value calculating portion calculates one of a linear function and a quadratic function of the change value of the wheel speed variation with respect to the front and rear wheel speed ratio, and also calculates the ideal status value based on calculated function of the change value.

8. A tire air pressure detection device comprising:

a vehicle wheel speed detecting portion (2a–2d, 3a) for detecting respective vehicle wheel speeds;

a rotational status value calculating portion (3b) for calculating a rotational value (D) expressing a relationship of the respective vehicle wheel speeds to cancel a wheel speed variation between left and right wheels generated due to vehicle turns;

a slip status value calculating portion (3c) for calculating a slip status value (β) based on the vehicle wheel speeds detected by the vehicle wheel speed detecting portion, the slip status value depending on a slip status between driven wheels and non-driven wheels;

a regression line calculating portion (3d) for calculating a regression line that is a linear function expressing a relationship between the rotational status value calculated by the rotational status value calculating portion and the slip status value calculated by the slip status value calculating portion;

a rotational status value compensating portion (3f) for compensating for the rotational status value calculated by the rotational status value calculating portion based on the regression line calculated by the regression line calculating portion;

a tire air pressure decrease detecting portion (3h) for detecting a tire air pressure decrease based on the rotational status value compensated for by the rotational status value compensating portion; and a selecting portion for selecting the rotational status value calculated by the rotational status value calculating portion and the slip status value calculated by the slip status value calculating portion within a predetermined available range;

wherein the regression line calculating portion calculates the regression line based on the rotational status value and the slip status value selected by the selecting portion.

9. The tire air pressure detection device according to claim 8, further comprising;

a regression line determining portion for determining whether the regression line is calculated by the regression line calculating portion;

wherein the selecting portion does not execute a selection when the regression line determining portion has determined that the regression line is not yet calculated, and executes the selection when the regression line determining portion has determined that the regression line has already been calculated.

10. The tire air pressure detection device according to claim 9, wherein the selecting portion defines the predetermined available range based on the regression line calculated by the regression line calculating portion.

11. The tire air pressure detection device according to claim 10, wherein the selecting portion defines a region that includes the regression line and regions having predetermined width on both sides of the regression line as the available range.

12. The tire air pressure detection device according to claim 8, further comprising:

a driven wheel determining portion for determining whether a wheel in which tire air pressure decreases is a driven wheel;

wherein the selecting portion defines at least one of a higher and lower threshold as the available range when the driven wheel determining portion determines that the wheel in which the tire air pressure decreases is the driven wheel.

13. The tire air pressure detection device according to claim 8, further comprising:

an ideal driving status calculating portion (3e) for calculating an ideal status value (βid) corresponding to a slippage value under an ideal driving status without tire slippage;

wherein the rotational status value compensating portion (3f) calculates an ideal rotational status value under the ideal driving status without tire slippage based on the regression line calculated by the regression line calculating portion and the ideal slip status value calculated by the ideal driving status calculating portion.

14. The tire air pressure detection device according to claim 13, further comprising:

a driven wheel determining portion for determining whether a wheel in which a tire air pressure decreases is a driven wheel;

wherein the selecting portion defines a region in which the slip status value is lower than the regression line as the available range when the driven wheel determining portion has determined that the wheel in which the tire air pressure decreases is the driven wheel.

15. The tire air pressure detection device according to claim 14, wherein the driven wheel determining portion determines whether the wheel in which the tire air pressure decreases is the driven wheel based on a slope of the regression line calculated by the regression line calculating portion.

16. The tire air pressure detection device according to claim 15, wherein the driven wheel determining portion determines that the wheel in which the tire air pressure decreases is the driven wheel when the slope of the regression line is larger than a predetermined threshold (K).

17. A tire air pressure detection device comprising:

a vehicle wheel speed detecting portion (2a–2d, 3a) for detecting respective vehicle wheel speeds;

a rotational status value calculating portion (3b) for calculating a rotational value (D) expressing a relationship of the respective vehicle wheel speeds to cancel wheel speed variation between left and right wheels generated due to vehicle turns;

a slip status value calculating, portion (3c) for calculating a slip status value (β) based on the vehicle wheel speeds detected by the vehicle wheel speed detecting portion, and the slip status value depending on a slip status between driven wheels and non-driven wheels;

a regression line calculating portion (3d) for calculating a regression line that is a linear function expressing a relationship between the rotational status value calculated by the rotational status value calculating portion and the slip status value calculated by the slip status value calculating portion;

a rotational status value compensating portion (3f) for compensating for the rotational status value calculated by the rotational status value calculating portion based on the regression line calculated by the regression line calculating portion;

a tire air pressure decrease detecting portion (3*h*) for detecting a tire air pressure decrease based on the rotational status value compensated for by the rotational status value compensating portion; and a non-uniformity detecting portion (3*i*) for detecting non-uniform of driven forces;

wherein the rotational status value compensating portion compensates for the rotational value based on the regression line now calculated by the regression line calculating portion when the non-uniformity detecting portion detects the non-uniform of the driven forces, and compensates for the rotational value based on the regression line previously calculated before by the regression line calculating portion when the non-uniformity detecting portion has not detected the non-uniform of the driven forces.

18. The tire air pressure detection device according to claim 17, wherein the non-uniformity detecting portion detects the non-uniformity of the driven forces based on non-uniformity of the slip status value calculated by the slip status value calculating portion.

19. The tire air pressure detection device according to claim 18, wherein the slip status value calculating portion calculates a front and rear wheel speed ratio (β) corresponding to a ratio of vehicle wheel speeds of front wheels and vehicle wheel speeds of rear wheels, and the non-uniformity detecting portion detects the non-uniformity of the driven forces based on non-uniform of the front and rear wheel speed ratio.

20. The tire air pressure detection device according to claim 19, further comprising:

a front and rear wheel speed ratio memorizing portion (3*c*) for memorizing the front and rear wheel speed ratio calculated by the slip status value calculating portion;

wherein the non-uniform detecting portion detects the non-uniform of the driven forces based on a difference (Ep) between a maximum value and a minimum value of the front and rear wheel speed ratio.

21. The tire air pressure detection device according to claim 20, wherein the non-uniform detecting portion detects the non-uniform of the driven forces when the difference between the maximum value and the minimum value of the front and rear wheel speed ratio is larger than a first reference value (Ep*+Eth).

22. The tire air pressure detection device according to claim 21, further comprising:

a slip variation memorizing portion for memorizing a slip variation (A) expressing a change in the wheel speed variation with respect to the front and rear wheel speed ratio, the slip variation being calculated by the regression line calculating portion;

wherein the slip variation memorizing portion renews a previously calculated slip variation to a presently calculated slip variation when the non-uniform detecting portion detects the non-uniform of the driven forces, defines a second reference value (Eth') larger than the first reference value when the slip variation is not renewed for a predetermined time (Cth), and detects the non-uniform of thee driven forces when the difference between the maximum value and the minimum value of the front and rear wheel speed ratio is larger than the second reference value.

23. The tire air pressure detection device according to claim 17, wherein the regression line calculating portion calculates a change value (A) of the wheel speed variation with respect to the front and rear wheel speed ratio, and the rotational status value compensating portion compensates for the rotational status value calculated by the rotational status value calculating portion based on the slip variation.

24. The tire air pressure detection device according to claim 23, further comprising:

a slip variation memorizing portion for memorizing the slip variation calculated by the regression line calculating portion;

wherein the slip variation memorizing portion renews a previously calculated slip variation to a presently calculated slip variation when the non-uniform of the driven forces detected by the non-uniform detecting portion is larger than a first reference value (Ep*+Eth), and the rotational status value compensating portion compensates for the rotational status value calculated by the rotational status value calculating portion based on the slip variation memorized in the slip variation memorizing portion.

25. The tire air pressure detection device according to claim 17, further comprising:

an ideal driving status calculating portion (3*e*) for calculating an ideal status value (βid) corresponding to a slip value under an ideal driving status without tire slippage;

wherein the rotational status value compensating portion (3*f*) calculates an ideal rotational status value under the ideal driving status without tire slip based on the regression line calculated by the regression line calculating portion and the ideal slip status value calculated by the ideal driving status calculating portion.

26. A tire air pressure detection device comprising:

a vehicle wheel speed detecting portion (2*a*–2*d*, 3*a*) for detecting respective vehicle wheel speeds;

a rotational status value calculating portion (3*b*) for calculating a rotational value (D) expressing a relationship of the respective vehicle wheel speeds to cancel a wheel speed variation between left and right wheels generated due to vehicle turns;

a slip status value calculating portion (3*c*) for calculating a slip status value (β) based on the vehicle wheel speeds detected by the vehicle wheel speed detecting portion, the slip status value depending on a slip status between driven wheels and non-driven wheels;

a regression line calculating portion (3*d*) for calculating a regression line that is a linear function expressing a relationship between the rotational status value calculated by the rotational status value calculating portion and the slip status value calculated by the slip status value calculating portion;

a rotational status value compensating portion (3*f*) for compensating for the rotational status value calculated by the rotational status value calculating portion based on the regression line calculated by the regression line calculating portion;

a tire air pressure decrease detecting portion (3*h*) for detecting a tire air pressure decrease based on the rotational status value compensated for by the rotational status value compensating portion; and a selecting portion for selecting data from data regarding the wheel speeds detected by the wheel speed detecting portion by removing data when the vehicle turns based on left and right non-driven wheels speeds ($V_{FL}$, $V_{FR}$);

wherein the rotational status value calculating portion calculates the rotational status value and the slip status value calculating portion calculates the slip status value based on the data selected by the selecting portion.

27. The tire air pressure detection device according to claim 26, wherein the selecting portion includes a left and right non-driven wheel speed ratio calculating portion for calculating a left and right non-driven wheel speed ratio (R) based on data of left and right non-driven wheel speeds detected by the wheel speed detecting portion, defines an available range based on the left and right non-driven wheel speed ratio calculated by the left and right non-driven wheel speed ratio calculating portion, and selects the data based on whether the left and right non-driven wheel speed ratio is in the available range.

28. A tire air pressure detection device comprising:

a vehicle wheel speed detecting portion (2*a*–2*d*, 3*a*) for detecting respective vehicle wheel speeds;

a rotational status value calculating portion (3*b*) for calculating a rotational value (D) expressing a relationship of the respective vehicle wheel speeds to cancel a wheel speed variation between left and right wheels generated due to vehicle turns;

a slip status value calculating portion (3*c*) for calculating a slip status value (β) based on the vehicle wheel speeds detected by the vehicle wheel speed detecting portion, the slip status value depending on a slip status between driven wheels and non-driven wheels;

a regression line calculating portion (3*d*) for calculating a regression line that is a linear function expressing a relationship between the rotational status value calculated by the rotational status value calculating portion and the slip status value calculated by the slip status value calculating portion;

a rotational status value compensating portion (3*f*) for compensating for the rotational status value calculated by the rotational status value calculating portion based on the regression line calculated by the regression line calculating portion;

a tire air pressure decrease detecting portion (3*h*) for detecting a tire air pressure decrease based on the rotational status value compensated for by the rotational status value compensating portion; and a selecting portion for defining an available range based on data regarding left and right non-driven wheel speeds included in the wheel speeds detected by the wheel speed detecting portion, and selecting data within the available range from the data regarding left and right non-driven wheel speeds;

wherein the rotational status value calculating portion calculates the rotational status value and the slip status value calculating portion calculates the slip status value based on the data selected by the selecting portion, and the available range is defined initially based on the data regarding left and right non-driven wheel speeds, and is then repeatedly renewed each time the selecting portion selects the data regarding left and right non-driven wheel speeds.

29. A tire air pressure detection device comprising:

a vehicle wheel speed detecting portion (2*a*–2*d*, 3*a*) for detecting respective vehicle wheel speeds;

a rotational status value calculating portion (3*b*) for calculating a rotational value (D) expressing a relationship of the respective vehicle wheel speeds to cancel a wheel speed variation between left and right wheels generated due to vehicle turns;

a slip status value calculating portion (3*c*) for calculating a slip status value (β) based on the vehicle wheel speeds detected by the vehicle wheel speed detecting portion, the slip status value depending on a slip status between driven wheels and non-driven wheels;

a regression line calculating portion (3*d*) for calculating a regression line that is a linear function expressing a relationship between the rotational status value calculated by the rotational status value calculating portion and the slip status value calculated by the slip status value calculating portion;

a rotational status value compensating portion (3*f*) for compensating for the rotational status value calculated by the rotational status value calculating portion based on the regression line calculated by the regression line calculating portion;

a tire air pressure decrease detecting portion (3*h*) for detecting a tire air pressure decrease based on the rotational status value compensated for by the rotational status value compensating portion;

a left and right non-driven wheel speed ratio calculating portion for calculating a left and right non-driven wheel speed ratio (R) based on data of left and right non-driven wheel speeds detected by the wheel speed detecting portion; and a left and right non-driven wheel speed ratio determining portion for defining an available range based on the left and right non-driven wheel speed ratio calculated by the left and right non-driven wheel speed ratio calculating portion, and determining whether the left and right non-driven wheel speed ratio is in the available range;

wherein the left and right non-driven wheel speed ratio determining portion selects the data within the available range from data regarding the wheel speed detected by the wheel speed detecting portion, and the rotational status value calculating portion calculates the rotational status value and the slip status value calculating portion calculates the slip status value based on the data selected by the left and right non-driven wheel speed ratio determining portion.

30. The tire air pressure detection device according to claim 29, wherein the left and right non-driven wheel speed ratio determining portion defines the available range based on an average value ($R_{AVE}$) of the left and right non-driven wheel speed ratio calculated by the left and right non-driven wheel speed ratio calculating portion.

31. The tire air pressure detection device according to claim 30, wherein the left and right non-driven wheel speed ratio determining portion defines a region ($R_{AVE}-Rw<R<R_{AVE}+Rw$) defined from a first value corresponding to average value minus a predetermined value (Rw) to a second value corresponding to average value plus the predetermined value as the available value.

* * * * *